(12) United States Patent
Prawitt et al.

(10) Patent No.: US 12,440,533 B2
(45) Date of Patent: Oct. 14, 2025

(54) COLLAGEN HYDROLYSATE COMPOSITION FOR REDUCING JOINT PAIN AFTER EXERCISE

(71) Applicant: ROUSSELOT B.V., Ghent (BE)

(72) Inventors: Janne Prawitt, Ghent (BE); Sebastiaan Johannes Wilhelmus Van Der Steen, Ghent (BE); Sara De Pelsmaeker, Ghent (BE); Willem Meindert Pelser, Ghent (BE); Frederik Beekmans, Ghent (BE); Hugues Moreau, Ghent (BE)

(73) Assignee: ROUSSELOT B.V., Ghent (BE)

( * ) Notice: Subject to any disclaimer, the term of this patent is extended or adjusted under 35 U.S.C. 154(b) by 0 days.

(21) Appl. No.: 18/861,616

(22) PCT Filed: May 3, 2023

(86) PCT No.: PCT/EP2023/061722
§ 371 (c)(1),
(2) Date: Oct. 30, 2024

(87) PCT Pub. No.: WO2023/213909
PCT Pub. Date: Nov. 9, 2023

(65) Prior Publication Data
US 2025/0114427 A1    Apr. 10, 2025

(30) Foreign Application Priority Data

May 4, 2022   (BE) .................................. 2022/5336

(51) Int. Cl.
| | | |
|---|---|---|
| *A61K 38/01* | (2006.01) | |
| *A61K 31/198* | (2006.01) | |
| *A61K 31/401* | (2006.01) | |
| *A61K 31/737* | (2006.01) | |
| *A61K 45/06* | (2006.01) | |
| *A61P 19/02* | (2006.01) | |
| *C07K 14/78* | (2006.01) | |

(52) U.S. Cl.
CPC .......... *A61K 38/014* (2013.01); *A61K 31/198* (2013.01); *A61K 31/401* (2013.01); *A61K 31/737* (2013.01); *A61K 45/06* (2013.01); *A61P 19/02* (2018.01); *C07K 14/78* (2013.01)

(58) Field of Classification Search
CPC .. A61K 38/014; A61K 31/737; A61K 31/198; A61K 31/401; C07K 14/78
See application file for complete search history.

(56) References Cited

U.S. PATENT DOCUMENTS

| | | | |
|---|---|---|---|
| 2007/0293427 A1* | 12/2007 | Vouland ................. | A61K 38/39 514/5.5 |
| 2011/0039767 A1 | 2/2011 | Nieuwenhuizen et al. | |
| 2012/0141448 A1 | 6/2012 | De Ferra | |
| 2014/0113861 A1* | 4/2014 | Escaich Ferrer .... | A61Q 19/007 435/68.1 |
| 2018/0021411 A1 | 1/2018 | Losso et al. | |
| 2020/0078435 A1 | 3/2020 | Michaud | |
| 2022/0295854 A1 | 9/2022 | Oesser | |

FOREIGN PATENT DOCUMENTS

| | | |
|---|---|---|
| CA | 3 074 541 A1 | 9/2021 |
| CN | 101289507 A | 10/2008 |
| CN | 112 813 127 A | 5/2021 |
| CN | 113271961 A | 8/2021 |
| CN | 113 615 783 A | 11/2021 |
| EP | 2 606 904 A1 | 6/2013 |
| JP | 2009 235064 A | 10/2009 |
| JP | 2012 116773 A | 6/2012 |
| JP | 2019-112361 A | 7/2019 |
| JP | 2019-529365 A | 10/2019 |
| WO | 2020/245299 A1 | 12/2020 |
| WO | 2021/156400 A1 | 8/2021 |
| WO | 2021/161186 A1 | 8/2021 |

OTHER PUBLICATIONS

International Search Report and Written Opinion for WO 2023/213909 (PCT/EP2023/061722), dated Sep. 7, 2023, pp. 1-17.
Search Report for BE 2022/5336, dated Jan. 16, 2023, pp. 1-14.
International Preliminary Report on Patentability for WO 2023/213909 (PCT/EP2023/061722), dated Jul. 18, 2024, pp. 1-30.
Database GNPD [Online] MINTEL; Jun. 12, 2018 (Jun. 12, 2018), anonymous: "Joint Pain Relieve Liquid", pp. 1-3.
Chinese Office Action for Patent Application No. 202380025162.8, dated Dec. 26, 2024, pp. 1-11 (Translation Included).
Miyab et al. The effect of a hydrolyzed collagen-based supplement on wound healing in patients with burn: A randomized double-blind pilot clinical trial. Burns 46: 156-163, 2020.
Leon-Lopez Arely et al: "Hydrolyzed Collagen-Sources and Applications", Molecules vol. 24, No. 22 Nov. 7, 2019 (Nov. 7, 2019), p. 4031.
Denise Zdzieblik et al: "Collagen peptide supplementation in combination with resistance training improves body composition and increases muscle strength in elderly sarcopenic men: a randomised controlled trial", British Journal of Nutrition, vol. 114, No. 8, Oct. 28, 2015 (Oct. 28, 2015), pp. 1237-1245.
Marra Annachiara et al: "The ABCDEF Bundle in Critical Care", Critical Care Clinics, vol. 33, No. 2, Apr. 1, 2017 (Apr. 1, 2017), pp. 225-243.
Rawal et al. Post-intensive care syndrome: an overview. J Translation Int Med 5(2): 90-92, 2017.
Chinese Office Action for Patent Application No. 202380013782.X, dated Jul. 26, 2024, pp. 1-18 (Translation Included).

(Continued)

*Primary Examiner* — Xiaozhen Xie
(74) *Attorney, Agent, or Firm* — Thomas|Horstemeyer, LLP

(57) ABSTRACT

The present invention relates to a composition comprising chondroitin sulfate and collagen hydrolysate, for use in ameliorating pain, preferably for use in ameliorating joint pain after exercise. The present invention furthermore relates to a method of preparing said composition by hydrolysis of a collagen-containing material comprising different types of collagen. The composition is preferably administered as a food supplement.

9 Claims, 4 Drawing Sheets

(56) References Cited

OTHER PUBLICATIONS

Japanese Office Action for Patent Application No. 2024-519454, dated Aug. 30, 2024, pp. 1-5 (Translation Included).
Chinese Office Action for Patent Application No. 202380013782.X, dated Oct. 31, 2024, pp. 1-10 (Translation Included).
Jiang Xirui, Novel Biotechnological Fermentation Products, first edition, China Light Industry Press, Aug. 2020, p. 331 (Translation not available).
Hong Hui, Collagen and Collagen Peptides Function and Application, first edition, China Light Industry Press, Jan. 2022, p. 4 (Translation not available).
Anonymous: "Peptan collagen peptides", Rousselot, Sep. 1, 2012 (Sep. 1, 2012), pp. 1-33.
Salvatore Luca et al: "Marine collagen and its derivatives: Versatile and sustainable bio-resources for healthcare", Materials Science and Engineering C, Elsevier Science S.A, CH, vol. 113, Apr. 17, 2020 (Apr. 17, 2020).
Lemalab: "How to Get Rid of Sugar Cravings", Aug. 28, 2021 (Aug. 28, 2021), pp. 1-3.
Kehinde Bababode Adesegun et al: "Recently isolated antidiabetic hydrolysates and peptides from multiple food sources: a review", Critical Reviews in Food Science and Nutrition, vol. 60, No. 2, Nov. 21, 2018 (Nov. 21, 2018), pp. 322-340.
Harnedy Padraigin A. et al: "Atlantic salmon (*Salmo salar*) co-product-derived protein hydrolysates: A source of antidiabetic peptides", Food Research International, vol. 106, Apr. 1, 2018 (Apr. 1, 2018), pp. 598-606.
Li-Chan Eunice C. Y. et al: "Peptides Derived from Atlantic Salmon Skin Gelatin as Dipeptidyl-peptidase IV Inhibitors", Journal of Agricultural and Food Chemistry, vol. 60, No. 4, Jan. 20, 2012 (Jan. 20, 2012), pp. 973-978.
Colbenson et al. Post-intensive care syndrome: impact. prevention, and management. Breathe 15(2): 98-101, 2019.

\* cited by examiner

COLLAGEN HYDROLYSATE COMPOSITION FOR REDUCING JOINT PAIN AFTER EXERCISE

CROSS-REFERENCE TO RELATED APPLICATIONS

This application is the National Stage of International Application No. PCT/EP2023/061722, filed May 3, 2023, which claims priority to BE 2022/5336, filed May 4, 2022, all of which are entirely incorporated herein by reference.

FIELD OF THE INVENTION

The present invention relates to a composition for use in ameliorating pain, such as joint pain and the like. The present invention furthermore relates to a method of preparing said composition. The composition is preferably administered as a food supplement.

BACKGROUND OF THE INVENTION

Joint pain is a common condition that may arise in middle-aged or older adults. Joint pain may have different aetiologies, but is most commonly relates to heavy exercise, injury, or an underlying medical condition such as obesity or a joint degenerative disease.

Joint pain is most commonly observed in the joints that are subjected to heavy and frequent loading, i.e. predominantly in the knee, shoulder, and hip joints. These joints are richly innervated by sensory and sympathetic nerves. Movement of the joints stimulates the free nerve endings, resulting into mechano-sensation of pain. In arthritic joints, so-called 'silent nociceptors' also become active, thereby contributing further to the generation of joint pain (McDougall et al. Arthritis Res. Ther. 8, 220, 2006).

Joint pain can be observed in healthy and physically-active individuals. Joint pain can also be observed in pathological conditions. In healthy individuals, joint pain may typically flourish during several days to weeks after heavy or prolonged exercise, after which the pain may disappear naturally. This can be considered as acute joint pain. The (transient) acute joint pain after heavy or prolonged exercise events is thought to be caused by higher transmission of loads and a limited ability for low-friction movements in the joints. In pathological conditions, the joint pain generally is chronic (i.e. does not disappear naturally). For example, the catabolic changes in the joint as seen in osteoarthritis, leads to chronic pain and joint stiffness. The associated inflammation in the joint may thereby cause peripheral sensitization and joint pain, irrespective of excessive loading or exercise events. It is considered that osteoarthritis currently cannot be cured, thus necessitating continuous symptomatic treatment of pain.

Joint pain is currently treated with conventional drugs to reduce pain and inflammation. The conventional drugs for joint pain include simple analgesics (e.g. acetaminophen) and non-steroidal anti-inflammatory drugs. These conventional drugs have several limitations. First, these drugs may not modulate the underlying pathology of the disease, as required for effective and prolonged cure from pain. Second, these drugs frequently cause adverse effects such as gastrointestinal toxicity, cardiovascular problems, renal and hepatic impairment and skin rashes (Zhang et al. Osteoarthr. Cartil., 18(4), 2010, 476-499, Sing et al. Arthritis Res. Ther., 2006, 8(5), R153). Third, the risk of adverse effects of these conventional drugs renders them inappropriate for the treatment of healthy individuals and physically active individuals (i.e. as a non-therapeutic use), such as in acute joint pain.

Based on the previous, safer and more accessible alternatives are warranted in the management of joint pain. A widely studied dietary supplement is glucosamine sulfate (GS). GS is a sulfated amino monosaccharide that acts as a substrate in the biosynthesis of cartilage proteoglycans. It is considered that GS decreases joint pain through the inhibition of catabolic enzymes and proinflammatory cytokines. Although GS is currently used in treatment of joint pain, systematic reviews have sown that GS may have only a small to moderate effect in reducing joint pain (Knapik et al. J. Spec. Oper. Med., Winter 2018; 18(4):139-147). Other dietary supplement that have been studied include combinations of active ingredients found in cartilage (and products derived thereof), including combination of collagen and chondroitin sulfate. For example, Ma et al. (Journal of Functional Foods (2021), 78, 104376) US2007293427A1, and US2003091652A1 describe compositions comprising a collagen hydrolysate derived from predominantly type II collagen and chondroitin sulfate, for the prevention of osteoarthritis and related symptoms. JP2009051833A discloses a composition comprising a combination of collagen, methylsulfonylmethane (MSM), glucosamine, and chondroitin sulfate, for ameliorating joint pain.

There currently remains an unmet need for compositions that more effectively and/or more safely ameliorate joint pain. Especially, there currently is an unmet need for compositions that more effectively and/or more safely ameliorate joint pain in healthy individuals after exercise.

The present invention aims to provide such a composition.

SUMMARY OF THE INVENTION

The inventors discovered a method to obtain a composition based on collagen hydrolysate and chondroitin sulfate, the use of which has a high efficacy in reducing joint pain. The composition of the invention was found to be superior in reducing joint pain than other compositions based on collagen hydrolysate and chondroitin sulfate.

The composition of the invention foremost comprises more appropriate amounts of active ingredients that maximally ameliorate pain, e.g. in comparison to compositions aimed at treating disease in a broad sense (i.e. osteoarthritis and related joint diseases). Moreover, the composition of the invention is effective in alleviating pain in a broad group of subjects, including both in chronic and acute pain, and/or both in pathological and physically-active subjects.

The current inventors have found that the composition of the invention has characterizing features which, alone and particularly in combination, realize a surprisingly high reduction of joint pain. The inventors found that more effective reduction of joint pain is realized with a composition wherein the collagen hydrolysate is derived from a collagen-containing starting material comprising a mixture of type I and type II collagen. In particular, a collagen hydrolysate produced from a collagen-containing starting material comprising collagen type I, collagen type II, and collagen type III in certain weight ratios, has an improved pain-reducing effect compared to other compositions comprising collagen hydrolysate and chondroitin sulfate. The composition of the invention was more effective in reducing pain as compared to compositions that predominantly contain type I collagen or type II collagen, respectively. The collagen hydrolysate of the current invention can be characterized by a hydroxyproline/Hydroxylysine molar ratio (Hyp/Hyl ratio) of 8-15 (i.e. indicating a mixture of peptides derived from appropriate amounts of different types of collagen) and/or by an average molecular weight of more than 1000 Da and less than 10,000 Da. The Hyp/Hyl ratio and/or the molecular weight appear to be relevant features for achieving the high reduction of pain. The inventors furthermore found that high reduction of joint pain may be achieved with a composition that comprises ~70% of collagen hydrolysate and ~30% chondroitin sulfate.

In one aspect, the current invention relates to a composition comprising 10-40 wt. % chondroitin sulfate and 60-90 wt. % collagen hydrolysate, calculated on the total weight of the chondroitin sulfate and the collagen hydrolysate,
  wherein the collagen hydrolysate is obtainable from the hydrolysis of a collagen containing material,
    wherein the collagen containing-material preferably comprises 40-60 wt. %
    collagen type I, calculated on the total weight of the collagen in the collagen-containing material,
    wherein the collagen containing-material preferably comprises 40-60 wt. % collagen type II, calculated on the total weight of the collagen in the collagen-containing material,
    wherein the collagen containing-material preferably comprises 5-20 wt. % collagen type III, calculated on the total weight of the collagen in the collagen-containing material.

In one aspect, the current invention relates to a composition comprising 10-40 wt. % chondroitin sulfate and 60-90 wt. % collagen hydrolysate, calculated on the total weight of the chondroitin sulfate and the collagen hydrolysate,
  wherein the collagen hydrolysate preferably comprises 40-60 wt. % collagen derived from type I collagen, calculated on the total weight of the collagen in the collagen hydrolysate,
  wherein the collagen hydrolysate preferably comprises 40-60 wt. % collagen derived from type II collagen, calculated on the total weight of the collagen in the collagen hydrolysate, and
  wherein the collagen hydrolysate preferably further comprises 5-20 wt. % collagen derived from type III collagen, calculated on the total weight of the collagen in the collagen hydrolysate.

In one aspect, the current invention relates to a use of the composition as disclosed herein in a therapeutic treatment.

In one aspect, the current invention relates to a use of the composition as disclosed herein for non-therapeutic amelioration of pain, preferably for non-therapeutic amelioration of joint pain such as after exercise.

In one aspect, the current invention relates to a use of the composition as disclosed herein for therapeutic amelioration of pain, preferably for therapeutic amelioration of joint pain such as after exercise.

In one aspect, the current invention relates to a method of treating pain in a subject, preferably joint pain such as after exercise, the method comprising administering the composition as disclosed herein to the subject.

In one aspect, the current invention relates to the use of the composition as disclosed herein for the manufacture of a medicament for ameliorating pain, preferably joint pain such as after exercise.

DETAILED DESCRIPTION OF THE INVENTION

Embodiments of the Composition of the Invention

In an embodiment, the current invention relates to a composition comprising 10-40 wt. % chondroitin sulfate and 60-90 wt. % collagen hydrolysate, calculated on the total weight of the chondroitin sulfate and the collagen hydrolysate.

The chondroitin sulfate may be present in the composition in an amount of at least 5 wt. %, 10 wt. %, 15 wt. %, 20 wt. %, 25 wt. %, 30 wt. %, 35 wt. %, 40 wt. %, 45 wt. %, or 50 wt. %, calculated on the total weight of the chondroitin sulfate and the collagen hydrolysate. The chondroitin sulfate may be present in the composition in an amount of no more than 50 wt. %, 45 wt. %, 40 wt. %, 35 wt. %, 30 wt. %, 25 wt. %, 20 wt. %, 15 wt. %, 10 wt. %, or 5 wt. %, calculated on the total weight of the chondroitin sulfate and the collagen hydrolysate.

In an embodiment, the chondroitin sulfate and/or the collagen hydrolysate as disclosed herein is derived from a collagen-containing material, preferably a collagen-containing material subjected to (enzymatic) hydrolysis. In an embodiment, the chondroitin sulfate and/or the collagen hydrolysate are derived from the same collagen-containing material, wherein the collagen-containing material is preferably subjected to (enzymatic) hydrolysis.

In an embodiment, the collagen hydrolysate disclosed herein comprises 1-25 wt. % (e.g. 2-20 wt. %, or 4-15 wt. %, or 5-10 wt. %) collagen derived from type III collagen, calculated on the total weight of the collagen in the collagen hydrolysate.

Collagen-Containing Material

The collagen-containing material as disclosed herein is preferably comprised of one or more (animal) collagen-containing tissues, although it is not excluded that the collagen-containing material is prepared (additionally) by introducing purified collagen products such as (commercially available) collagen powder.

The preferred amounts of collagen sub-types (e.g. type I, II, III collagen) in the collagen-containing material can be achieved by selecting and combining the appropriate tissue(s) or collagen-containing material(s). The skilled person is aware that the relative amounts of collagen sub-types is dependent on the tissue and the origin of the tissue (e.g. species of animal, age of animal). In the art, the amount and type of collagen is either known or can be determined using textbook and other common methods such as ELISA (or similar antibody-based) assays. To control and determine the actual collagen content and the collagen sub-types in a collagen-containing material used in the invention, it is preferred to use such qualitative and quantitative methods. Depending on the outcome, the skilled person can adjust the method of processing the collagen-containing material and/or combining two or more collagen-containing materials.

In an embodiment, the collagen-containing material is derived from a (animal) tissue, wherein the relative amounts of collagen subtypes are naturally present in the desired range, preferably 40-60 wt. % type I collagen and 40-60 wt. % collagen type II collagen, calculated on the total weight of the collagen in the collagen-containing material.

In an embodiment, the collagen-containing material is a combination of two or more (animal) tissues, e.g. with different relative amounts of collagen sub-types (e.g. type I, II, III collagen). For example, a collagen-containing material comprising 50 wt. % type I collagen and 50 wt. % type II collagen, calculated on the total weight of the collagen in the collagen-containing material, can be obtained by combining a first collagen-containing material comprising X wt. % type I collagen (but lacking type II collagen) with a second collagen-containing material comprising X wt. % type II collagen (but lacking type I collagen) in a 1:1 weight ratio. For collagen-containing materials that contain a mixture of subtypes of collagen (e.g. both type and I, II), appropriate weighted calculations can be made of the required amount of first and further collagen-containing material.

Depending on the type of (animal) tissue, selected region(s) of the tissue may be more appropriate to achieve the composition of the collagen-containing material of the invention. For example, the sternum is known to comprise both bone and cartilage tissue. By harvesting the appropriate region or layer of tissue, the relative amounts of collagen type I (i.e. relatively higher in bone tissue) and collagen type II (i.e. relatively higher in cartilage tissue) can be adjusted. Moreover, such processing can achieve improved purity of a certain type of collagen.

There are different suitable methods to quantitatively measure the content of total collagen and collagen sub-types in a (tissue) sample. The Sirius Red based collagen assay is a widely used assay for collagen quantification and based on precipitation of soluble or solubilized collagen. Sirius Red is known to bind fibrillar collagens. Sirius Red based collagen assays are commercially-available (e.g. Chondrex Inc Sirius Red Total Collagen Detection Assay Kit, Biocolor Sircol assay, QuickZyme Soluble Collagen assay). In hydrolyzed samples, the collagen content is preferably measured using a hydroxyproline based collagen assay, which are also commercially-available (e.g. Chondrex Inc Hydroxyproline Assay Kit, QuickZyme Total Collagen assay). The hydroxyproline assay is suitable for determining total collagen content for both native and denatured collagen.

The preferred method to quantify a collagen sub-type in a sample preferably involves detecting the collagen using a specific antibodies and subsequently quantifying the amount of bound antibody. The amount of collagen can be calculated using a standard curve using known amounts of collagen. Collagen type-specific antibodies are supplied by companies such as Chondrix Inc, R & D Systems, and Abcam. Enzyme-linked immunosorbent assay (ELISA) based methods are generally considered very accurate in quantifying the level of antibody in a given sample. ELISA is one of the most commonly used biochemistry assays, and the skilled person is capable of establishing an (own) appropriate ELISA protocol based on the protein and/or sample of interest. Commercial ELISA kits are also available to determine the amounts of collagen sub-types (e.g. collagen type I, collagen type II, collagen type III) in a sample. For example, Chondrex Inc offers ELISA kits to measure Bovine Type I Collagen (Catalog #6014), Porcine (Catalog #6015), and an ELISA kit to measure multi-species Type II collagen (Catalog #6018).

A preferred method to determine the collagen sub-type in a hydrolyzed sample is through sequencing of collagen sub-type-specific amino acid sequences by liquid chromatography with tandem mass spectrometry (LC-MS/MS), such as based on the method of Piestansky et al. (Pharm. Biomed. Anal. 2020 Sep. 10; 189:113449). A preferred protocol is the protocol below, disclosed by Ma et al. (Journal of Functional Foods (2021), 78, 104376): samples are chromatographed on the C18 column (2.1 mm×100 mm, 1.7 μm) at 40° C. using a TripleTOF 5600 system (AB SCIEX Corporation Co., Ltd, USA). Mobile phase A is 0.1% formic acid in acetonitrile and mobile phase B is 0.1% formic acid in water. The flow rate and injection volume are 0.25 mL/min and 10 μL. The elution condition is set to 0-39 min, 5-80% A; 42 min, 80% A; 42.5 min, 80-5% A; 46 min, 5% A. Mass spectrometry scan range is 350-1500 m/z with the positive ion reaction mode, and data are searched by ProteinPlot™ (version 5.0.2.0) software using the uniprot's collagen database. Falsediscovery rate (FDR) is set at FDR ≤0.01.

In a preferred embodiment, the current invention relates to a composition comprising 10-40 wt. % chondroitin sulfate and 60-90 wt. % collagen hydrolysate, calculated on the total weight of the chondroitin sulfate and the collagen hydrolysate,
    wherein the collagen hydrolysate is obtainable from the hydrolysis of a collagen containing material,
        wherein the collagen containing-material preferably comprises 40-60 wt. %
        collagen type I, calculated on the total weight of the collagen in the collagen-containing material, and/or
        wherein the collagen containing-material preferably comprises 40-60 wt. % collagen type II, calculated on the total weight of the collagen in the collagen-containing material, and/or
        wherein the collagen containing-material preferably comprises 5-20 wt. % collagen type III, calculated on the total weight of the collagen in the collagen-containing material.

In an embodiment, the current invention relates to a composition comprising 10-40 wt. % chondroitin sulfate and 60-90 wt. % collagen hydrolysate,
    wherein the collagen hydrolysate preferably comprises 40-60 wt. % type I collagen, calculated on the total weight of the collagen in the collagen hydrolysate, and/or
    wherein the collagen hydrolysate preferably comprises 40-60 wt. % type II collagen, calculated on the total weight of the collagen in the collagen hydrolysate, and/or
    wherein the collagen hydrolysate preferably further comprises 5-20 wt. % type III collagen calculated on the total weight of the collagen in the collagen hydrolysate.

Hyaluronic acid is a constituent of cartilage that has been suggested for the treatment of joint pain (Migliore et al. Rheumatol. Ther. 2021 December; 8(4): 1617-1636). Because hyaluronic acid is a natural component of cartilage tissue, compositions based on collagen hydrolysate (and/or chondroitin sulfate) generally also comprise substantial amounts of hyaluronic acid (typically at least 0.5 wt. %). The presence of hyaluronic acid can be either desirable or undesirable (contamination). Unexpectedly, the inventors found that a composition comprising less than 0.5 wt. % hyaluronic acid provides an improved reduction in joint pain as compared to a composition comprising 0.5 wt. % or more hyaluronic acid. This means that it may be preferred to have relatively little hyaluronic acid, and/or a high weight ratio of chondroitin sulfate:hyaluronic acid, in the composition.

In an embodiment, the composition as disclosed herein comprises less than 2 wt. % hyaluronic acid, preferably less than 1 wt. % hyaluronic acid, more preferably less than 0.5 wt. % hyaluronic acid even more preferably less than 0.1 wt. % hyaluronic acid, by weight of the composition. For example, the composition as disclosed herein may comprise hyaluronic acid in an amount of 0-1 wt. %, or 0-0.5 wt. %, or 0-0.1 wt. %, or 0-0.05 wt. %, or 0-0.01 wt. %, by weight of the composition.

In an embodiment, the weight ratio of chondroitin sulfate and hyaluronic acid in the composition as disclosed herein is 10000:1-10:1, preferably 1000:1-100:1. The weight ratio of chondroitin sulfate and hyaluronic acid in the composition as disclosed herein may be at least 10:1, or at least 100:1, or at least 1000:1, or at least 10000:1. In addition or alternatively, the weight ratio of chondroitin sulfate and hyaluronic acid in the composition as disclosed herein may be no more than 10000:1, or no more than 1000:1, or no more than 100:1, or no more than 10:1.

The "hyaluronic acid" as disclosed herein preferably has a molecular weight of 4000-10000 kDa, preferably 5000-9000 kDa, more preferably 6000-8000 kDa, wherein the molecular weight is preferably the average molecular weight.

Embodiments of the Chondroitin Sulfate of the Invention

As used herein, the term "chondroitin sulfate" (i.e. chondroitin sulphate) refers to a negatively charged polymeric glycosaminoglycan consisting of alternating glycuronic acid and N-acetylhexosamine residues connected by (β1-3 hexuronidic and β1-4-N-acetylhexosaminidic bonds. The term "chondroitin sulfate" herein encompasses a fraction with little or no sulfation. The term "chondroitin sulfate" may herein be used interchangeably with the term "chondroitin". A preferred method to quantify chondroitin sulfate in a material is by enzymatic hydrolysis of chondroitin sulfate followed by high performance liquid chromatography. The chondroitin sulfate may for example be treated with either chondroitinase ABC or chondroitinase AC enzyme to selectively hydrolyze the chondroitin sulfate to unsaturated disaccharide units. Chondroitinase ABC will hydrolyze both chondroitin sulfate and dermatan sulfate (sometimes referred to as "chondroitin sulfate B"), while chondroitinase AC is specific for chondroitin sulfate. The resulting unsaturated disaccharide units can then be separated and quantified by ion-exchange chromatography, or reversed-phase chromatography, with either ultraviolet detection, conductivity detection, or precolumn derivatization with fluorescence detection (Ji et al. Journal of AOAC INTERNATIONAL, Volume 90, Issue 3, 1 May 2007, Pages 659-669). A preferred protocol is disclosed by Ji et al. (Journal of AOAC INTERNATIONAL, Volume 90, Issue 3, 1 May 2007, Pages 659-669).

The chondroitin sulfate as disclosed herein may have an average molecular weight of at least 1 kDa, or at least 2.5 kDa, or at least 5 kDa, or at least 7.5 kDa, or at least 10 kDa, or at least 12.5 kDa, or at least 15 kDa, or at least 17.5 kDa, or at least 20 kDa, or at least 25 kDa, or at least 30 kDa. In addition or alternatively, the chondroitin sulfate as disclosed herein may have an average molecular weight of no more than 40 kDa, or no more than 35 kDa, or no more than 30 kDa, or no more than 25 kDa, or no more than 20 kDa, or no more than 17.5 kDa, or no more than 15 kDa, or no more than 12.5 kDa, or no more than 10 kDa.

In a preferred embodiment, the chondroitin sulfate as disclosed herein has an average molecular weight of 10-35 kDa, preferably 15-30 kDa, more preferably 17-27 kDa.

The inventors found that the molecular weight of the chondroitin sulfate may determine the biological activity in terms of reducing pain, particularly in combination with collagen hydrolysate.

In an embodiment, a composition comprising chondroitin sulfate with an average molecular weight of 15-30 kDa provides a higher reduction in pain as compared to a composition comprising chondroitin sulfate with an average molecular weight of less than 15 kDa or more than 30 kDa.

In an embodiment, a composition comprising chondroitin sulfate with an average molecular weight of 17-27 kDa provides a higher pain reduction as compared to a composition comprising chondroitin sulfate with an average molecular weight of less than 17 kDa or more than 27 kDa.

Suitable and preferred methods of measuring the molecular weight of the chondroitin sulfate is by gel permeation chromatography (GPC) or high performance size-exclusion chromatography (HP-SEC), e.g. after treating the samples with chondroitin sulfate with a sodium acetate-ethanol solution to precipitate the glycosaminoglycans and obtaining the chondroitin sulfate-rich fraction (pellet). In addition or alternatively, a preferred method of determining chondroitin sulfate molecular weight is by GPC as described by Vázquez et al. (Polymers (Basel). 2020 Nov. 6; 12(11):2613).

Embodiments of the Collagen Hydrolysate of the Invention

As used herein, the term "collagen hydrolysate" means a mix of short chains of amino acids derived from a collagen-containing material having native (full-length) collagen, preferably obtained via hydrolysis steps, including enzymatic hydrolysis (also called enzymatic hydrolyzation). The "collagen hydrolysate" herein may encompasses collagen which is subjected to hydrolysis or partial hydrolysis. The term "collagen hydrolysate" may be used interchangeably and synonymously with the terms "collagen hydrolysate" "hydrolysed collagen" or "collagen peptide". The "collagen hydrolysate" herein can either be produced from a collagen-containing material in a one-step process or via the intermediate gelatin stage, in which e.g. type A and/or type B gelatin (e.g. a mixture of type A and type B gelatin) are preferably used. The "collagen hydrolysate" herein may encompass hydrolysed gelatin, which is obtained by hydrolysis of gelatin (obtained from collagen). The terms "collagen hydrolysate", "gelatin hydrolysate", "hydrolyzed gelatin" and "hydrolysed gelatin" may be used interchangeably and synonymously in the current disclosure.

In an embodiment, the collagen hydrolysate as disclosed herein has an average molecular weight of 500-10000 Da, e.g. 600-9000 Da, or 700-8000 Da, or 800-7000 Da, or 900-6000 Da, or 1000-7000 Da, or 1100-6000 Da, or 1200-5000 Da, or 1300-6000 Da, or 1400-5000 Da, or 1500-4500 Da.

The average molecular weight as disclosed herein is preferably the weight average molecular weight.

It appears that the reduction in pain is largest when the average molecular weight of the collagen hydrolysate is more than 1000 Da and less than 10,000 Da. The effect appears most pronounced for a collagen hydrolysate with an average molecular weight of more than 1000 Da and less than 5000 Da.

In an embodiment, the collagen hydrolysate as disclosed herein has an average molecular weight of 1000-10000 Da.

In an embodiment, the collagen hydrolysate as disclosed herein has an average molecular weight of 1000-5000 Da, preferably 1100 Da-5000 Da, or 1200-4500 Da, or 1300-4000 Da, or 1400-3500 Da, or 1500-3000 Da.

A suitable and preferred method of measuring the molecular weight of the collagen hydrolysate is by high performance size-exclusion chromatography (HP-SEC), e.g. after treating the samples with collagen hydrolysate with a sodium acetate-ethanol solution to precipitate the protein-poor fraction (including glycosaminoglycans) and using the protein-rich fraction (supernatant) for HP-SEC of the collagen hydrolysate. In addition or alternatively, a preferred method of determining the collagen hydrolysate molecular weight is according to Edgar et al. (Sci. Rep. 2018 Jul. 11; 8(1):10474).

In an embodiment, the collagen hydrolysate as disclosed herein comprises hydroxyproline in an amount of 1-30 wt. %, preferably 2-20 wt. %, more preferably 5-15 wt. %, most preferably 8-12 wt. %, all per total weight of the amino acids in the collagen hydrolysate.

In an embodiment, the collagen hydrolysate as disclosed herein comprises hydroxylysine in an amount of 0.1-5 wt. %, preferably 0.2-2 wt. %, more preferably 0.5-1.25 wt. %, most preferably 0.7-1 wt. %, all per total weight of the amino acids in the collagen hydrolysate.

In an embodiment, the collagen hydrolysate as disclosed herein comprises hydroxyproline in an amount of 10-200 amino acids (i.e. AA) per 1000 AA in the collagen hydrolysate, preferably 50-100 AA per 1000 AA in the collagen hydrolysate.

In an embodiment, the collagen hydrolysate as disclosed herein comprises hydroxylysine in an amount of 1-20 AA per 1000 AA in the collagen hydrolysate, preferably 2-10 AA per 1000 AA in the collagen hydrolysate.

In an embodiment, the collagen hydrolysate as disclosed herein comprises hydroxyproline and hydroxylysine in a molar ratio (hydroxyproline:hydroxylysine) of 1-30 (e.g. 5-19, or 6-18, or 7-17, or 8-16, or 9-15, or 10-14, or 11-13), preferably 5-20, more preferably more than 8 and less than 15.

Collagen subtypes significantly differ in the Hydroxyproline/Hydroxylysine molar ratio, which can be used for their identification. The Hydroxyproline/hydroxyline molar ratio in a (hydrolyzed) sample can be correlated to the collagen subtypes in the collagen-containing starting material (Ignat'eva et al. Journal of Analytical Chemistry, 2007, Vol. 62, No. 1, pp. 51-57), Blumenkrantz et al. Clinical Biochemistr. Volume 13, Issue 4, August 1980, Pages 177-183). Generally:

- a hydroxyproline/hydroxylysine ratio of <7.5 (e.g. ~5) indicates predominantly type II collagen (in the collagen-containing starting material);
- a hydroxyproline/hydroxylysine ratio >10 (e.g. 10-20) indicates predominantly type I collagen (in the collagen-containing starting material);
- a hydroxyproline/hydroxylysine ratio >15 (e.g. 15-25) indicates predominantly type III collagen (in the collagen-containing starting material);
- a hydroxyproline/hydroxylysine ratio of >8 and <15 indicates a mixture of type I, II, and III collagen (in the collagen-containing starting material).

Above correlations between the hydroxyproline/hydroxylysine ratio and the collagen subtypes are used in the current disclosure.

In an embodiment, the hydroxyproline/hydroxylysine molar ratio of more than 8 and less than 15 indicates that 40-60 wt. % of the collagen is derived from type I collagen and that 40-60 wt. % of the collagen is derived from type I collagen, and furthermore that preferably 40-60 wt. % of the collagen is derived from type II collagen, wherein the wt. % is calculated on the total weight of the collagen (e.g. in the collagen-containing material subjected to hydrolysis).

A preferred method of determining the molar ratio of hydroxyproline and hydroxylysine is by reversed-phase high-performance liquid chromatography and mass spectrometry, such as described by Langrock et al. (Chromatogr. B Analyt. Technol. Biomed. Life Sci. 2007 Mar. 1; 847(2): 282-8). Hydroxyproline can also be measured with a hydroxyproline based collagen assay as disclosed herein. A preferred method of determining the molar ratio of hydroxyproline and hydroxylysine is according to the publication by Blumenkrantz et al. (Clinical Biochemistr. Volume 13, Issue 4, August 1980, Pages 177-183).

Method for Preparing the Composition

In an embodiment, one or more components (e.g. collagen hydrolysate, chondroitin sulfate) of the composition are obtained by subjecting a collagen-containing material to hydrolysis, preferably enzymatic hydrolysis.

The enzymatic hydrolysis as disclosed herein preferably comprises subjecting the collagen-containing material to one or more enzymes selected from the group consisting of serine protease, alkaline protease, neutral protease, flavour protease, complex protease, thiol protease, bromelain, metalloprotease, aspartame, protease, carboxypeptidase, pepsin, chymotrypsin, trypsin, cathepsin K, chymotrypsin, papain, and subtilisin.

In an embodiment, the collagen-containing material as disclosed herein is derived from a tissue comprising cartilage. In an embodiment, the collagen-containing material as disclosed herein is derived from a tissue comprising bone. In an embodiment, the collagen-containing material as disclosed herein is derived from a tissue comprising bone and cartilage.

The "cartilage" as disclosed herein is preferably hyaline cartilage.

As used herein, material Y is said to be "derived from" material X, if material Y comprises material X. In addition or alternatively, as used herein, material Y is said to be "derived from" material X, if material Y comprises a processed form of material X, wherein the processing may be one or more of: comminution, grinding, heat treating, hydrolysis, and filtration. In the current disclosure, the term "derived from" may be used interchangeably and as synonym with the terms "obtained from" or "originating from".

The collagen herein may be one or more selected from the group consisting of type I collagen, type II collagen, type III collagen, type IV, type V collagen and type X collagen.

Preferably, the collagen hydrolysate as disclosed herein is derived from one or more types of collagen selected from the group consisting of type I collagen, type II collagen, type III collagen, and type VI collagen. In addition or alternatively, the collagen hydrolysate as disclosed herein is preferably derived from animal raw material that comprises different collagen subtypes, such as two or more of collagen type I, collagen type II, collagen type III, and collagen type IV. In addition or alternatively, the collagen hydrolysate as disclosed herein may be a mixture of two or more of type I, type II, type III, and type IV collagen.

The hydrolyzed collagen as disclosed herein is preferably derived from collagen type I, type II, type III collagen, and type IV collagen.

The collagen as disclosed herein may be derived from any one or more animals or species of animals, such as bovine species, pig species, chicken and fish species.

In an embodiment, the collagen is derived from a cow. In an embodiment, the collagen as taught herein is derived from a pig. In an embodiment, the collagen as taught herein is derived from a fish. In an embodiment, the collagen as taught herein is derived from a chicken.

In various embodiments, the collagen is a mixture of collagen from different sources, such as collagen originating from multiple animal species and/or collagen originating from different tissues. For example, the collagen as disclosed herein may be a mixture of two or more collagens chosen from the group consisting of fish collagen, porcine collagen, chicken collagen, and bovine collagen.

In an embodiment, the collagen as disclosed herein is derived from an animal other than a bird, preferably other than a chicken. In an embodiment, the chondroitin sulfate as disclosed herein is derived from a tissue obtained from an animal other than a bird, preferably other than a chicken. In an embodiment, the collagen hydrolysate as disclosed herein is derived from a tissue obtained from an animal other than a bird, preferably other than a chicken. In an embodiment, the collagen-containing material as disclosed herein does not comprise tissue obtained from a bird, preferably does not comprise tissue obtained from a chicken.

The collagen-containing material as disclosed herein may be derived from one or more tissues selected from the group consisting of skin, scale, antler, protrusions (e.g. humps) horns, head, brain, neck, ear, eye, nose, tongue, lip, mouth, oesophagus, trachea, sternum, larynx, bronchi, limbs, feet, toes, palms, claws, bones, cartilage, bone marrow, joints, membranes, hind, ligaments, tendon, rib, diaphragm, muscle, skeletal muscle, smooth muscle, intestine, blood vessels, bladder, stomach, aorta, heart, liver, kidney, chest, lung, spleen, pancreas, egg, sperm, testis, ovary, nerve, gallbladder, and belly. The term "skin" as disclosed herein encompasses "hide", i.e. meaning the outer covering of large animals such as from the bovine group or any other large animals. The terms "skin" and "hide" may herein be used interchangeably, and may refer the outer coverage of an animal, irrespective of size.

In an embodiment, the collagen-containing material is derived from trachea, sternum, or a mixture thereof.

In an embodiment, the collagen containing-material comprises 20-80 wt. % (e.g. 25-70 wt. %, or 30-65 wt. %, or 35-60 wt. %, or 40-55 wt. %) type I collagen and 20-80 wt. % (e.g. 25-70 wt. %, or 30-65 wt. %, or 35-60 wt. %, or 40-55 wt. %) type II collagen, calculated on the total weight of the collagen in the collagen-containing material.

In an embodiment, the collagen-containing material comprises 1-25 wt. %, e.g. 2-20 wt. %, or 3-15 wt. %, or 4-10 wt. %, collagen derived from type III collagen, calculated on the total weight of the collagen in the collagen-containing material.

In an embodiment, the collagen-containing material comprises 5-20 wt. % type III collagen, calculated on the total weight of the collagen in the collagen-containing material. In an embodiment, the collagen-containing material comprises 0.5-20 wt. %, preferably 1-10 wt. %, more preferably 2-5 wt. % type IV collagen, calculated on the total weight of the collagen in the collagen-containing material.

In a preferred embodiment, the current invention relates to a composition comprising 10-40 wt. % chondroitin sulfate and 60-90 wt. % collagen hydrolysate, calculated on the total weight of the chondroitin sulfate and the collagen hydrolysate,
wherein the collagen hydrolysate preferably comprises 40-60 wt. % collagen derived from type I collagen, calculated on the total weight of the collagen in the collagen hydrolysate, and/or
wherein the collagen hydrolysate preferably comprises 40-60 wt. % collagen derived from type II collagen, calculated on the total weight of the collagen in the collagen hydrolysate, and/or
wherein the collagen hydrolysate preferably comprises 5-20 wt. % collagen derived from type III collagen, calculated on the total weight of the collagen in the collagen hydrolysate.

The current invention also relates to a process of preparing the composition of the invention by hydrolysis of a collagen containing material, preferably comprising one or more of the following steps:
a) comminuting the collagen-containing material, preferably by grinding;
b) enzymatic hydrolysis;
c) a first separation step;
d) enzyme deactivation and heat treatment;
e) a second separation step;
f) concentrating the mixture;
g) drying.

In an embodiment, the enzymatic hydrolysis (step b) is performed at pH 5-8, preferably pH 6-7. In an embodiment, the enzymatic hydrolysis (step b) is performed at a temperature of 55-70° C., preferably 60-65° C. In an embodiment, the enzymatic hydrolysis (step b) is performed for 4-7 hours, preferably 5-6 hours.

In an embodiment, the first separation step (step c) comprises subjecting the hydrolysate (obtained in step c) to a temperature of 60-90° C., preferably 70-80° C. In an embodiment, the second separation step (step e) comprises subjecting the hydrolyzed collagen-containing material to a temperature of 75-99° C., preferably 85-99° C. In an embodiment, the second separation step (step e) comprises subjecting the hydrolyzed collagen-containing material to filtration.

The filtration herein (in step e) is preferably by:
using one or more filtration sheets with a water permeability of 2-2000 (l/min*m² at 1 bar), preferably 10-1000 (l/min*m² at 1 bar), more preferably 20-500 (l/min*m² at 1 bar); and/or
using one or more filtration sheets with degree of separation of 0.02-100 (mK), preferably 0.1-50 (mK), more preferably 0.2-10 (mK); and/or
using one or more filtration sheets with a weight per unit area of 100-6000 (g/m²), preferably 500-4000 (g/m²), more preferably 1000-2000 (g/m²).

The one or more separation steps disclosed herein may determine the wt. %, weight ratio, or characteristics (e.g. molecular weight, dispersity) of the collagen hydrolysate, chondroitin sulfate and/or hyaluronic acid in the composition. In addition or alternatively, the one or more separation steps disclosed herein (i.e. step c and/or step e) may determine the sterility of the composition. In particular, it was found that the desired amounts of chondroitin sulfate and/or hyaluronic acid in the composition may be achieved by one or more separation steps as disclosed herein.

In a preferred embodiment, the desired amount of hyaluronic acid in the composition, and/or the desired weight ratio of chondroitin sulfate and hyaluronic acid, is achieved by performing the second separation step (i.e. step e):
at 65-99° C., preferably 75-99° C., more preferably 85-99° C.; and/or
using one or more filtration sheets with a water permeability of 2-2000 (l/min*m² at 1 bar), preferably 10-1000 (l/min*m² at 1 bar), more preferably 20-500 (l/min*m² at 1 bar); and/or
using one or more filtration sheets with degree of separation of 0.02-100 (mK), preferably 0.1-50 (mK), more preferably 0.2-10 (mK); and/or
using one or more filtration sheets with a weight per unit area of 100-6000 (g/m²), preferably 500-4000 (g/m²), more preferably 1000-2000 (g/m²).

Using the one or more of the above steps in step e), a composition containing a hyaluronic acid level of less than 0.5 wt. % is achieved.

(Therapeutic) Use of the Composition

As part of the invention, each of the collagen hydrolysate and chondroitin sulfate independently, or their combination, may act as an active ingredient in achieving the (therapeutic) effect, such as amelioration of joint pain, e.g. meaning that it induces a biological response in cells and/or the body.

In an embodiment, the composition as disclosed herein is for use in amelioration of pain, preferably joint pain. In an embodiment, the composition as disclosed herein is for use in therapeutic amelioration of pain, preferably therapeutic amelioration of joint pain. In an embodiment, the composition as disclosed herein is for use in non-therapeutic amelioration of pain, preferably non-therapeutic amelioration of joint pain.

In an embodiment, the composition as disclosed herein is for use in amelioration of pain, preferably pain after exercise. In an embodiment, the composition as disclosed herein is for use in therapeutic amelioration of pain, preferably therapeutic amelioration of pain after exercise. In an embodiment, the composition as disclosed herein is for use in non-therapeutic amelioration of pain, preferably non-therapeutic amelioration of pain after exercise.

In an embodiment herein, the exercise as disclosed herein is exercise overload. In an embodiment, the exercise as disclosed herein is strength training. In an embodiment, the exercise as disclosed herein is endurance training. In an embodiment, the exercise as disclosed herein is sports.

In an embodiment, the current invention relates to a method of treating pain in a subject, preferably of treating joint pain in a subject, more preferably of treating joint pain after exercise in a subject, the method comprising administering the composition as disclosed herein to the subject.

The method of treatment of pain may comprise one or more features described herein according to the therapeutic use of the composition as disclosed herein, including embodiments of the composition, the formulation(s) of the composition, the timing(s) of administration composition, and the dosing(s) of the composition described for the therapeutic use of the composition.

In an embodiment, the current invention relates to the use of the composition as disclosed herein for the manufacture of a medicament for treating pain as disclosed herein.

The use of the composition for the manufacture of a medicament as disclosed herein may comprise one or more features described herein for the therapeutic use of the composition as disclosed herein, including embodiments of the composition, the formulation(s) of the composition, the timing(s) of administration composition, and the dosing(s) of the composition described for the therapeutic use of the composition.

As used herein, "pain" (e.g. joint pain, pain after exercise) preferably means any level of pain that can be measured using a (validated) pain scale, preferably by one or more of the VAS, NPRS, and WOMAC scale. In addition or alternatively, "pain" can be (e.g. joint pain, pain after exercise) (any level of) pain that is established by a professional medical practitioner.

The visual analogue scale (VAS) score is a measure for acute and chronic pain. With the VAS, scores are recorded by subjects making a handwritten mark on a 100-mm line that represents a continuum between "no pain" and "worst pain" (Breivik et al. Br. J. Anaesth. 2008 July; 101(1):17-24). In an embodiment, "pain" is defined by a VAS score of at least 1 mm, preferably at least 10 mm, more preferably at least 40 mm, even more preferably at least 70 mm. In an embodiment, "joint pain" is defined by a VAS score of at least 1 mm, preferably at least 10 mm, more preferably at least 40 mm, even more preferably at least 70 mm, when subjects report the pain that is experienced specifically in one or more joints. In an embodiment, "joint pain after exercise" is defined by a VAS score of at least 1 mm, preferably at least 10 mm, more preferably at least 40 mm, even more preferably at least 70 mm, when subjects report the pain that is experienced specifically in one or more joints after exercise (e.g. within 24 hours, 48 hours, or 72 hours after exercise).

In an embodiment, the "ameliorating" or "amelioration" of pain as used herein means a reduction in VAS score of at least 1 mm, preferably at least 10 mm, more preferably of at least 20 mm (e.g. when comparing the VAS score to a control not receiving the composition of the invention and/or when comparing the VAS score before and after treatment with the composition of the invention).

The Numeric Pain Rating Scale (NPRS) is a measure for acute and chronic pain, in which subjects rate their pain on an 11-point numerical scale. The scale is composed of 0 (no pain at all) to 10 (worst imaginable pain) (Hwaker et al. Arthritis Care Res. (Hoboken). 2011 November; 63 Suppl. 11:S240-52). In an embodiment, "pain" is defined by a NPRS score of at least 1, preferably at least 3, more preferably at least 5, even more preferably at least 7. In an embodiment, "joint pain" is defined by a NPRS score of at least 1, preferably at least 3, more preferably at least 5, even more preferably at least 7, when subjects report the pain that is experienced specifically in one or more joints. In an embodiment, "joint pain after exercise" is defined by a NPRS score of at least 1, preferably at least 3, more preferably at least 5, even more preferably at least 7, when subjects report the pain that is experienced specifically in one or more joints after exercise (e.g. within 24 hours, 48 hours, or 72 hours after exercise).

In an embodiment, the "ameliorating" or "amelioration" of pain herein means a reduction in NPRS score at least 1, preferably at least 2, more preferably of at least 3 (e.g. when comparing the NPRS score to a control not receiving the composition of the invention and/or when comparing the NPRS score before and after treatment with the composition of the invention).

The Western Ontario and McMaster Universities osteoarthritis index (WOMAC) score is a measure of severity of osteoarthritis, with subscale scores for pain, stiffness, and physical functioning of the joints (Bellamy et al. J. Rheumatol. 1988 December; 15(12):1833-40). The WOMAC measures five items for pain (score range 0-20), two for stiffness (score range 0-8), and 17 for functional limitation (score range 0-68). Items are rated using one of five possible responses (0=none, 1=mild, 2=moderate, 3=severe, 4=extreme).

In an embodiment, "pain" is defined by a WOMAC score for one or more items of pain (rated using one of five responses: 0=none, 1=mild, 2=moderate, 3=severe, 4=extreme) of at least 1, preferably at least 2, more preferably at least 3, even more preferably of 4. In an embodiment, "joint pain" is defined by a WOMAC score for one or more items of pain of at least 1, preferably at least 2, more preferably at least 3, even more preferably of 4, when subjects report the pain that is experienced specifically in one or more joints. In an embodiment, "joint pain after exercise" is defined by a WOMAC score for one or more items of pain of at least 1, preferably at least 2, more preferably at least 3, even more preferably of 4, when subjects report the pain that is experienced specifically in one or more joints after exercise (e.g. within 24 hours, 48 hours, or 72 hours after exercise).

In an embodiment, the "ameliorating" or "amelioration" of pain herein means a reduction in WOMAC score for one or more items of pain (rated using one of five responses: 0=none, 1=mild, 2=moderate, 3=severe, 4=extreme) of at least 1, preferably at least 2, more preferably of at least 3 (e.g. when comparing the WOMAC score to a control not receiving the composition of the invention and/or when comparing the WOMAC score before and after treatment with the composition of the invention).

The inventors found positive result in reducing joint pain using the composition of the invention, regardless of gender and exercise intensity.

The inventors also found positive result in reducing joint pain in all age categories, wherein the reduction in joint pain among the different age categories appears largest in relatively young subjects (e.g. <30 years). Since increased age is a risk factor for joint diseases (predominantly osteoarthritis), the composition of the invention may be particularly effective in subjects not suffering a joint disease (predominantly osteoarthritis).

In an embodiment, the composition as disclosed herein is for reducing pain in subjects in the age category <30 years.

In an embodiment, the composition as disclosed herein is for reducing pain in male and/or female subjects.

In an embodiment, the composition as disclosed herein is for reducing pain in moderate exercise and/or activities of low impact on the joints, e.g. walking, swimming, flexibility/balance, gardening, cycling, dancing and horse riding.

In an embodiment, the composition as disclosed herein is for reducing pain in moderate intensity activities and/or activities of moderate joint impact, e.g. weightlifting, gym cardio or boxing.

In an embodiment, the composition as disclosed herein is for reducing pain in high intensity activities and/or activities of high joint impact, e.g. running, ball sports, skipping or (heavy) weightlifting.

Therapeutic Vs. Non-Therapeutic Use

The composition as disclosed herein can have both a non-therapeutic and a therapeutic use in ameliorating pain. The non-therapeutic or therapeutic uses can be separated based on nature of the pain and/or the distinctive groups of subjects experiencing the pain.

The first group (herein the "group of healthy subjects") comprises healthy persons who do not receive therapeutic benefit from the treatment with the composition of the invention. For example, the pain may be non-pathological, meaning that the pain generally has a severity that is not expected to lead to health issues or (severe) suffering. In addition or alternatively, the pain may have a cause or severity such that the pain naturally disappears over time (i.e. it is not chronic). In addition or alternatively, the severity of pain in the group of healthy subjects is limited, such that they would generally not seek help from a professional medical practitioner. For example, a healthy subject would generally not seek help from a medical practitioner, when the pain occurs mostly after exercise and the pain normally disappears without further intervention. In this example, a non-therapeutic intervention may nevertheless effect a faster pain relief. The group of healthy subjects may need less or shorter treatment with the composition of the invention to prevent and/or treat pain, as compared to subjects wherein the pain is of a pathological nature.

The second group (herein the "group of pathological subjects") comprises subjects wherein the pain is of a pathological nature, meaning that the pain leads to serious symptoms of pain and (severe) suffering, and/or may lead to (serious) health and psychological risks. In addition, the pain may be chronic in the group of pathological subjects. The severity of the pain is such that help from a professional medical practitioner is generally sought for. The group of pathological subjects may require more or longer treatment with composition of the invention, as compared to subjects wherein the pain is of a non-pathological nature.

The professional medical practitioner is typically able to determine on a case-by-case basis whether a pain condition requires a therapeutic or a non-therapeutic intervention (i.e. whether a person falls in the group of healthy subjects or in the group of pathological subjects). The professional medical practitioner may for instance establish whether the pain may lead to (serious) health and psychological risks and/or whether it is chronic pain.

In an embodiment, the current invention pertains to a use of the composition in the non-therapeutic amelioration of pain. In a preferred embodiment, the current invention pertains to a use of the composition in the non-therapeutic amelioration of joint pain. In a preferred embodiment, the current invention pertains to a use of the composition in the non-therapeutic amelioration of pain after exercise. In a preferred embodiment, the current invention pertains to a use of the composition in the non-therapeutic amelioration of joint pain after exercise.

In an embodiment, the current invention pertains to the composition for use in the (therapeutic) amelioration of pain, wherein the pain is preferably one or more selected from the group consisting of fibromyalgia, chronic low back pain, headache, migraine headaches, tension headaches, irritable bowel syndrome, chronic pelvic pain, phantom limb pain, carpal tunnel syndrome, sciatica, postherpetic neuralgia, gout, cancer pain, neuropathic pain, complex regional pain syndrome (CRPS), myofascial pain syndrome and endometriosis-associated pain.

In an embodiment, the current invention pertains to the composition for use in the (therapeutic) amelioration of pain in joint disease.

In a preferred embodiment, the joint disease is one or more selected from the group consisting of osteoarthritis, joint degenerative disease, rheumatoid arthritis, polymyalgia rheumatica, juvenile arthritis, gout, ankylosing spondylitis, psoriatic arthritis, chondromalacia patellae, periarticular disease and costochondritis.

In an embodiment, the composition as disclosed herein is for reducing pain in a subject without joint disease, wherein the joint disease preferably means one or more of osteoarthritis, rheumatoid arthritis, septic arthritis, juvenile idiopathic arthritis, lupus, gout, and bursitis.

Administration of the Composition

The term "composition" as used herein preferably means that individual components (e.g. collagen hydrolysate, chondroitin sulfate) are provided as a physical union (i.e. in a single formulation). The term "composition" as used herein does not exclude that the individual components (e.g. collagen hydrolysate, chondroitin sulfate) are not in a physical union, such as in separate formulations as part of a combination or kit-of-parts. The optimal administration scheme of collagen hydrolysate and chondroitin sulfate may be determined on a case-to-case basis, and is for example dependent on the subject to be treated, the condition to be treated, or on the formulation used.

In an embodiment, the individual components (e.g. collagen hydrolysate, chondroitin sulfate) are in a separate formulation, such as part of a combination. In an embodiment, the individual components (e.g. collagen hydrolysate, chondroitin sulfate) are in a single formulation (i.e. a composition). In an embodiment, the individual components (e.g. collagen hydrolysate, chondroitin sulfate) are administered separately, sequentially or simultaneously to each other, such as part of a combination. In an embodiment, the individual components (e.g. collagen hydrolysate, chondroitin sulfate) are separately packed in the form of a "kit-of-parts".

The effect of the composition may be more pronounced when the individual components (e.g. collagen hydrolysate, chondroitin sulfate) are administered not too far apart from each other, e.g. to improve (the interaction between) the bioactivity of the collagen hydrolysate and the chondroitin sulfate. In an embodiment, the collagen hydrolysate and the chondroitin sulfate are administered no more than 24 hours, preferably no more than 12 hours, more preferably no more than 6 hours even more preferably no more than 2 hours (e.g. 60, 30, or 15 min) separated from each other.

In a preferred embodiment, the collagen hydrolysate and/or the chondroitin sulphate as disclosed herein is administered orally, wherein the collagen hydrolysate and the chondroitin sulphate are in a single formulation (i.e. composition) or in separate formulations.

In an embodiment, the collagen hydrolysate and/or chondroitin sulphate as disclosed herein is provided in one or more formulations selected from the group consisting of food formulation, feed formulation, food supplement formulation, feed supplement formulation, or pharmaceutical formulation, preferably a food supplement formulation, wherein the collagen hydrolysate and the chondroitin sulphate are provided in a single formulation (i.e. composition) or in separate formulations.

In a preferred embodiment, the composition according to the invention is for use as a food supplement.

In an embodiment, the collagen hydrolysate and/or chondroitin sulphate as disclosed herein are provided in one or more formulations selected from the group consisting of a capsule, a tablet, or a powder, preferably a powder, wherein the collagen hydrolysate and the chondroitin sulphate are provided in a single formulation (i.e. composition) or in separate formulations.

In an embodiment, the collagen hydrolysate and/or chondroitin sulphate as disclosed herein is provided in one or more formulations selected from the group consisting of a drinkable solution or suspension, drink such as beer, syrup, artificially-flavoured drink, carbonated beverage, (water-soluble) powdered mixture, (water-soluble) paste, (water-soluble) powder, (water-soluble) tablet, (water-soluble) pill, (water-soluble) dragee, (water-soluble) caplet, (water-soluble) sachet, or (water-soluble) capsule. In addition or alternatively, the collagen hydrolysate as taught herein may be present in a functional food such as a juice, shake, dairy drink, yoghurt, yoghurt drink, dessert, energy bar, nutritional bar, slimming bar, or confectionery such as gummies or center-filled gummies, wherein the collagen hydrolysate and the chondroitin sulphate are provided in a single formulation (i.e. composition) or in separate formulations.

In an embodiment, the composition (for use) as disclosed herein is administered at a daily dose of 20 mg-50 g, preferably 50 mg-20 g, more preferably 0.1 g-10 g, even more preferably 0.2 g-2 g, wherein the daily dose is the total dry weight amount of the composition.

In an embodiment, the composition (for use) as disclosed herein is administered at a unit dose of 10 mg-25 g, preferably 25 mg-10 g, more preferably 50 mg-5 g, even more preferably 0.1 g-1 g, wherein the unit dose is the total dry weight amount of the composition.

The daily dose and/or the unit dose of the composition (for use) as disclosed can herein be at least 0.1, 0.2, 0.3, 0.4, 0.5, 0.6, 0.7, 0.8, 0.9, 1, 2, 3, 4, 5, 6, 7, 8, 9, 10, 15, 20, 25, 30, 35, 40, 45, or 50, all in g, wherein the dose is the dry weight amount of the composition administered to a subject. In addition or alternatively, in different embodiments, the daily dose and/or the unit of the composition (for use) as disclosed herein is no more than 50, 45 40, 35, 30, 25, 20, 10, 9, 8, 7, 6, 5, 4, 3, 2, 1, 0.9, 0.8, 0.7, 0.6, 0.5, 0.4, 0.3, 0.2, or 0.1, all in g, wherein the dose is the dry weight amount of the composition administered to a subject.

The term "daily dose" as used herein refers to the total dry weight amount administered to a subject per day.

The daily dose of the composition may be administered as a single unit dose, or as two, three, four or more unit doses. The two or more unit doses may be equal or different in amount. The daily dose of the composition as disclosed herein is preferably administered as two unit doses, more preferably as two unit doses each corresponding to 30-70%, preferably 40-60% of the daily dose amount.

In a preferred embodiment, the dosage regimen for the composition as disclosed herein comprises administering the daily dose of the composition as two unit doses, wherein:
- each unit dose is in an amount of 0.1-2 g, preferably 0.2-1 g, more preferably 0.3-0.7 g, wherein the amount is the dry weight amount of the composition; and/or
- the two unit doses are administered at least 6 hours, preferably 8 hours, more preferably 12 hours separated from each other.

The term "unit dose" as used herein relates to the total dry weight amount administered to a subject in a single dose. The unit dose typically is in a pre-prepared form (e.g. prepacked dosage) ready for administration. The unit dose may for example (also) be identifiable from the product packaging or label.

The "daily dose" and the "unit dose" refer to the total dry weight, also when the individual components (e.g. collagen hydrolysate, chondroitin sulfate) are administered as a combination in separate formulations. For example, a subject is considered to have been administered 4 g of the composition, when the subject is administered 2 g collagen hydrolysate in a first formulation and 2 g chondroitin sulfate in a second formulation. For example, a subject is considered to have been administered 0.5 gram of the composition, when the subject is administered 0.3 g collagen hydrolysate in a first formulation and 0.2 g chondroitin sulfate in a second formulation.

The inventors observed the largest reduction in joint pain starting three weeks after starting daily administration (2×0.5 g/day) of the composition in healthy subjects. The reduction in joint pain was maintained by the daily administration (2×0.5 g/day) of the composition. The reduction in joint pain was observed for at least another 4 weeks (e.g. 6-8 weeks) after stopping administration of the composition (i.e. in the "wash-out period") This shows that, particularly in healthy subjects after exercise, the composition preferably is administered daily, and preferably over a prolonged period of time (e.g. three or more consecutive weeks).

In an embodiment, the composition as disclosed herein is administered to a subject repeatedly, preferably at least once every day or at least once every other day.

In an embodiment, the composition as disclosed is administered to a subject for at least two consecutive weeks, preferably for at least four consecutive weeks, more preferably for at least six consecutive week, most preferably for at least eight consecutive weeks.

In an embodiment, the composition is administered for at least 2, 3, 4, 5, 6, 7, 10, 14, or 21 days before the amelioration of pain is effected or most effective, wherein the days are preferably consecutive days.

In an embodiment, the daily administration of the composition for at least three weeks leads to a reduction in joint pain for at least another 4 weeks, preferably for at least another 6 weeks, more preferably for at least another 8 weeks, after stopping the administration of the composition (i.e. in the wash-out period).

Definitions

The term "enzymatic hydrolysis" as used herein means a process that uses one or more enzymes to cleave one or more bonds in collagen by means of enzymes, preferably so that smaller (peptide) fragments are formed. "Enzymatic hydrolysis" herein encompasses partial hydrolysis.

As used herein, the term "ameliorating" encompasses both the "preventing" and the "treating" of a condition. The term "preventing" means to ensure that a subject will not develop a condition (e.g. pain, joint pain). An intervention is herein also considered to be a form of "preventing" when a condition is delayed, reduced in severity and/or reduced in incidence, even when the condition is not entirely kept from happening. As used herein, "preventing" or "prevention" by an intervention encompasses the situation wherein a subject previously has experienced a condition (e.g. pain, joint pain), but an intervention keeps the condition from recurring. The "preventing" or "prevention" may have a therapeutic and/or a non-therapeutic effect. If the "preventing" or "prevention" is therapeutic in nature, it may be also directed at a symptom of a disease or condition and/or an underlying pathology thereof. The "preventing", or "prevention can be defined by any delay, change in severity, and/or change in incidence, such as of at least 5, 10, 20, 30, 40, 50, 60, 70, 80, 90, 100%, as compared to a control or reference as measured by any standard technique. As used herein, "treating" means that an intervention reduces and/or cures a condition (e.g. pain, joint pain) once the condition is already existing. The "treating" may have a therapeutic and/or a non-therapeutic effect. If the "treating" is therapeutic in nature, it may be directed at a symptom of a disease or condition and/or an underlying pathology thereof. The treatment can for example be any reduction in severity, incidence, and/or frequency of the condition, such as of at least 5%, 10%, 20%, 40%, 50%, 60%, 80%, 90%, 95%, or 100%, as compared to a control or reference as measured by any standard technique. As used herein, "ameliorating" also encompasses "curing". The term "ameliorating" may herein be used interchangeably with "reducing" or "decreasing.

The terms 'comprising' or 'to comprise' and their conjugations, as used herein, refer to a situation wherein said terms are used in their non-limiting sense to mean that items following the word are included, but items not specifically mentioned are not excluded. It also encompasses the more limiting verb 'to consist essentially of' and 'to consist of'.

Reference to an element by the indefinite article 'a' or 'an' does not exclude the possibility that more than one of the elements is present, unless the context clearly requires that there be one and only one of the elements. The indefinite article 'a' or 'an' thus usually means 'at least one'.

As used herein, a level is "increased" or "decreased" when it is at least 1%, such as 5%, 10%, 15%, 20%, 25%, 30%, 35%, 40%, 45%, or 50% higher or lower, respectively, than the corresponding level in a control or reference. Alternatively, a level in a sample may be considered increased or decreased when it is statistically significantly higher or lower, respectively, compared to a level in a control or reference (including an earlier time point). The term "to reduce" may herein be used interchangeably with "to decrease". The term "reducing" may herein be used interchangeably with "decreasing".

As used herein, the terms "subject" or "person" refer to any animal (e.g. a mammal), preferably a human.

The terms "administer" or "administration" as used herein comprise providing a compound, substance, or composition to a subject consuming it. A subject consuming a compound, substance, or composition may administer it to himself/herself. In such a case the term "administer" can be read as "take in".

The term "unit dose" as used herein relates to an amount or unit of e.g. a compound, substance, or composition administered to/taken by a subject in a single dose. The unit dose may for example be in a pre-prepared form (e.g. prepacked dosage) ready for administration to a subject. The unit dose may for example (also) be identifiable from the product packaging or label. The total daily dose may be divided into multiple unit doses each having a reduced dose as compared to the total daily dose.

The term "joint" as used herein preferably means or more of the group consisting of knee, shoulder, hip, finger joint, elbow, toe joint, neck joint, wrist joint, facet joint. In an embodiment, the joint is the knee joint. In an embodiment, the joint is the shoulder joint. In an embodiment, the joint herein is the hip joint.

The term "exercise" as used herein means any physical activity that can be planned, structured, and has a final or an intermediate objective. The term "exercise" as used herein typically has as goal the improvement or maintenance of physical fitness. The term "exercise" can herein be used interchangeable with "physical exercise". For example, "exercise" may include all professional or non-professional activities including: sports, strength or resistance training, and endurance or aerobic activities. In addition or alternative, "exercise" may include endurance training. The term "endurance training" refers to training the aerobic system as opposed to the anaerobic system, e.g. by performing physical exercise at an increased heart rate for a prolonged period of time (e.g. at 70% maximum heart rate (MHR) for at least 30 minutes), for example during walking, running, jogging, cycling, swimming, rope jumping etc. In the current disclosure, the term "exercise" encompasses "exercise overload". The term "exercise overload" as used herein relates to an overload of body caused by high strains and/or forces applied on body parts (e.g. joints) during any form of physical exercise. The overload is typically caused by acute overload, however it may also be caused by repetitive overload. Exercise overload, foremost acute overload, typically leads to high strains on the joints (e.g. knee, shoulder, hip), which may cause microdamage.

The terms "consecutive" or "consecutively" as used herein in the context an administration herein means that the administrations follow one another in order without gaps in a given time period. For example, when "the composition is administered for 4 consecutive days", this means that the composition is administered for at least once a day for 4 days in a row (e.g. on Monday, Tuesday, Wednesday, and Thursday of the same week), irrespective of the number of administrations per day or the total number of administrations. For example, when "the composition is administered for 4 consecutive weeks", this means that the composition is administered for at least once a week for 4 weeks in a row, irrespective of the number of administrations per day, the number of administrations per week or the total number of administrations.

Clauses

Herein, clauses are embodiments of the invention. Features of clauses (embodiments) herein can be combined.
Clause 1:
Composition comprising 10-40 wt. % chondroitin sulfate and 60-90 wt. % collagen hydrolysate, calculated on the total weight of the chondroitin sulfate and the collagen hydrolysate,
wherein the collagen hydrolysate is obtainable from the hydrolysis of a collagen containing material,
wherein the collagen containing-material comprises 40-60 wt. % collagen type I and 40-60 wt. % collagen type II, calculated on the total weight of the collagen in the collagen-containing material.

Clause 2:
Composition according to clause 1, further comprising 5-20 wt. % type III collagen, calculated on the total weight of the collagen in the collagen-containing material.

Clause 3:
Composition according to clause 1 or 2, wherein the collagen hydrolysate has an average molecular weight of more than 1000 Da and less than 10000 Da.

Clause 4:
Composition according to clause 3, wherein the collagen hydrolysate has an average molecular weight of more than 1000 Da and less than 5000 Da.

Clause 5: Composition according to any one of the previous clauses, wherein the collagen hydrolysate comprises 2-20 wt. % hydroxyproline and/or 0.1-5 wt. % hydroxylysine, wherein the wt. % is calculated on the total weight of the amino acids in the collagen hydrolysate.

Clause 6:
Composition according to any one of the previous clauses, wherein the collagen hydrolysate comprises hydroxyproline and hydroxylysine in a molar ratio (hydroxyproline:hydroxylysine) of more than 8 and less than 15.

Clause 7:
Composition according to any one of the previous clauses, comprising 15-40 wt. %, preferably 20-40 wt. %, more preferably 30-40 wt. % chondroitin sulfate, calculated on the total weight of the chondroitin sulfate and the collagen hydrolysate.

Clause 8:
Composition according to any one of the previous clauses, wherein the chondroitin sulfate is obtained from the hydrolysis of the collagen containing material.

Clause 9:
Composition according to any one of the previous clauses, wherein the hydrolysis is enzymatic hydrolysis.

Clause 10:
Composition according to any one of the previous clauses, wherein the collagen containing-material is derived from one or more tissues comprising cartilage.

Clause 11:
Composition according to clause 10, wherein the tissue is trachea and/or sternum.

Clause 12:
Composition comprising 10-40 wt. % chondroitin sulfate and 60-90 wt. % collagen hydrolysate, calculated on the total weight of the chondroitin sulfate and the collagen hydrolysate,
  wherein the collagen hydrolysate comprises 40-60 wt. % collagen derived from type I collagen, calculated on the total weight of the collagen in the collagen hydrolysate, and
  wherein the collagen hydrolysate comprises 40-60 wt. % collagen derived from type II collagen, calculated on the total weight of the collagen in the collagen hydrolysate.

Clause 13:
Composition according to clause 12, wherein the collagen hydrolysate further comprises 5-20 wt. % collagen derived from type III collagen, calculated on the total weight of the collagen in the collagen hydrolysate.

Clause 14:
Composition according to clause 12 or 13, wherein the collagen hydrolysate has an average molecular weight of more than 1000 Da and less than 10000 Da.

Clause 15:
Composition according to clause 14, wherein the collagen hydrolysate has an average molecular weight of more than 1000 Da and less than 5000 Da.

Clause 16:
Composition according to any one of clauses 12-15, wherein the collagen hydrolysate comprises 2-20 wt. % hydroxyproline and/or 0.1-5 wt. % hydroxylysine, wherein the wt. % is calculated on the total weight of the amino acids in the collagen hydrolysate.

Clause 17:
Composition according to any one of clauses 12-16, wherein the collagen hydrolysate comprises hydroxyproline and hydroxylysine in a molar ratio (hydroxyproline:hydroxylysine) of more than 8 and less than 15.

Clause 18:
Composition according to any one of clauses 12-17, comprising 15-40 wt. %, preferably 20-40 wt. %, more preferably 30-40 wt. % chondroitin sulfate, calculated on the total weight of the chondroitin sulfate and the collagen hydrolysate.

Clause 19:
Composition according to any one of clauses 1-18, for use in a therapeutic treatment.

Clause 20:
Composition according to any one of clauses 1-18, for use in therapeutic amelioration of pain.

Clause 21:
Composition according to any one of clauses 1-18, for use in non-therapeutic amelioration of pain.

Clause 22:
Composition for use according to clause 20 or 21, wherein the pain is joint pain.

Clause 23:
Composition for use according to clause 22, wherein the joint pain is after exercise.

Clause 24:
Composition for use according to any one of clauses 19-23, wherein the composition is administered orally.

Clause 25:
Composition for use according any one of clauses 19-24, for use as a food supplement.

Clause 26:
Composition for use according to any one of clauses 19-25, wherein the composition is administered at a daily dose of 0.2-2 g, wherein the daily dose is the total dry weight amount of the composition.

Clause 27:
Use of a composition in the non-therapeutic amelioration of pain,
  wherein the composition comprises 10-40 wt. % chondroitin sulfate and 60-90 wt. % collagen hydrolysate, calculated on the total weight of the chondroitin sulfate and the collagen hydrolysate,
  wherein the collagen hydrolysate comprises hydroxyproline and hydroxylysine in a molar ratio (hydroxyproline:hydroxylysine) of more than 8 and less than 15.

Clause 28: Use according to clause 27, wherein the pain is joint pain.

Clause 29:
Use according to clause 27 or 28, wherein the pain is after exercise.

Clause 30:
Use according to any one of the clauses 27-29, wherein the collagen hydrolysate comprises 2-20 wt. % hydroxyproline, wherein the wt. % is calculated on the total weight of the amino acids in the collagen hydrolysate.

Clause 31:
Use according to any one of the clauses 27-31, wherein the collagen hydrolysate comprises 0.1-5 wt. % hydroxylysine, wherein the wt. % is calculated on the total weight of the amino acids in the collagen hydrolysate.

Clause 32:
Use according to any one of the clauses 27-31, the composition comprising 15-40 wt. %, preferably 20-40 wt. %, more preferably 30-40 wt. % chondroitin sulfate, calculated on the total weight of the chondroitin sulfate and the collagen hydrolysate.

Clause 33:
Use according to any one of the clauses 27-32, wherein the collagen hydrolysate has an average molecular weight of more than 1000 Da and less than 10000 Da.

Clause 33:
Use according to any one of the clauses 27-33, wherein the composition is administered orally.

Clause 34:
Use according to any one of the clauses 27-34, wherein the composition is provided as food supplement.

Clause 35:
Use according to any one of the clauses 27-35, wherein the composition is administered at a daily dose of 0.2-2 g, wherein the daily dose is the total dry weight amount of the composition.

Clause 36:
Composition for use in the amelioration of pain in joint disease,
wherein the composition comprises 10-40 wt. % chondroitin sulfate and 60-90 wt. % collagen hydrolysate, calculated on the total weight of the chondroitin sulfate and the collagen hydrolysate,
wherein the collagen hydrolysate comprises hydroxyproline and hydroxylysine in a molar ratio (hydroxyproline:hydroxylysine) of more than 8 and less than 15.

Clause 37:
Composition for use according to clause 36, wherein the joint disease is one or more selected from the group consisting of osteoarthritis, joint degenerative disease, rheumatoid arthritis, polymyalgia rheumatica, juvenile arthritis, gout, ankylosing spondylitis, psoriatic arthritis, chondromalacia patellae, periarticular disease and costochondritis.

Clause 38:
Composition for use according to any one of clauses 36-37, wherein the collagen hydrolysate comprises 2-20 wt. % hydroxyproline, wherein the wt. % is calculated on the total weight of the amino acids in the collagen hydrolysate.

Clause 39:
Composition for use according to any one of clauses 36-38, wherein the collagen hydrolysate comprises 0.1-5 wt. % hydroxylysine, wherein the wt. % is calculated on the total weight of the amino acids in the collagen hydrolysate.

Clause 40:
Composition for use according to any one of clauses 36-39, the composition comprising 15-40 wt. %, preferably 20-40 wt. %, more preferably 30-40 wt. % chondroitin sulfate, calculated on the total weight of the chondroitin sulfate and the collagen hydrolysate.

Clause 41:
Composition for use according to any one of clauses 36-40, wherein the collagen hydrolysate has an average molecular weight of more than 1000 Da and less than 10000 Da.

Clause 42:
Composition for use according to any one of clauses 36-41, wherein the composition is administered orally.

Clause 43:
Composition for use according to any one of clauses 36-42, wherein the composition is provided as food supplement.

Clause 44:
Composition for use according to any one of clauses 36-43, wherein the composition is administered at a daily dose of 0.2-2 g, wherein the daily dose is the total dry weight amount of the composition.

EXAMPLES

Example 1

Figure 1:
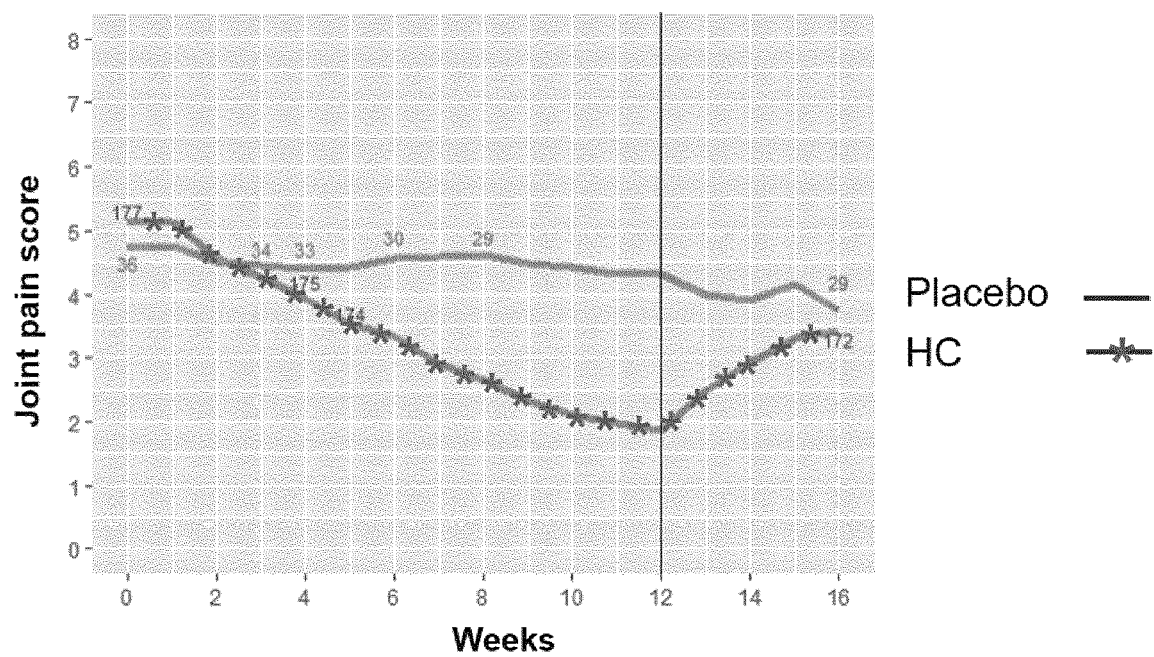
FIG. 1. Effect of composition based on collagen hydrolysate (HC) versus placebo on joint pain feel over a period of 16 weeks. Intake of the supplements was stopped after 12 weeks (represented by the vertical dashed line). The numbers in the plot corresponds with the number of subjects.

The following protocol is a general protocol used to prepare a composition comprising collagen hydrolysate and chondroitin sulfate, starting with a mixture comprising porcine trachea and sternum tissue.

The amount of type I, II, and III collagen in the tissues was established by ELISA. The relative amounts of trachea and sternum tissue were combined as to achieve a weight ratio of Type I, Type II, Type III collagen of ~5:5:1 in the starting mixture.

The general protocol involves the steps:
a) Grinding of the collagen-containing material;
b) Enzymatic hydrolysis (pH=6-7, T=60-65° C., t=5-6 h);
c) First separation step and heat treatment (T=70-80° C.);
d) Enzyme activation and heat treatment (T>90° C., t>15 min);
e) Second separation step using one or more filtration sheets with a water permeability of 20-500 (l/min*m$^2$ at 1 bar), a degree of separation of 0.2-10 (mK), and a weight per unit area of 1000-2000 (g/m$^2$), and heat treatment (T=85-99° C.);
f) Concentration under vacuum;
g) Drying.

Above protocol yields a composition comprising collagen hydrolysate and chondroitin sulfate with the general characteristics according to Table 1. The product is referred to as "HC" in Examples 2-4.

Variations in the starting material and protocol can be applied to adjust the composition and bioactivity (as shown in Examples 3 and 4).

TABLE 1

Product characteristics and nutritional information of the composition based on collagen hydrolysate and chondroitin sulfate (also referred to as "HC" in the Examples). AA = amino acids.

| Typical Product Characteristics Standard parameters | Specifications |
|---|---|
| Total collagen | 55-70% |
| Average Molecular Weight protein rich fraction | 1200-3000 Da |
| Total chondroitin sulfate | 12-25% |
| Average Molecular Weight chondroitin sulfate | 17-27 kDa |
| Viscosity (20%, 25° C.) | 8-15 mPa·s |
| Loss on drying | 8-10% |
| Residue on ignition | 8-10% |
| Hydroxyproline (per protein content) | 6-12 g/100 g protein |
| Hydroxyproline (per amino acid content) | 50-110 AA/1000 AA |
| Hydroxylysine (per protein content) | 0.5-2 g/100 g protein |
| Hydroxylysine (per amino acid content) | 2-10 AA/1000 AA |
| Hydroxyproline/Hydroxyline molar ratio | ~8.5-15 |

| Typical nutritional information Standard parameters | For 100 g |
|---|---|
| Protein | 65 g |
| Fat | 1 g |
| Carbohydrates | 18 g |
| Fiber | 0 g |
| Sodium | 1560 mg |
| Converted to salt | 3.9 g |
| Vitamins | 0 g |
| Minerals | |
| Potassium | 560 mg |
| Calcium | 130 mg |
| Magnesium | 40 mg |
| Energy | 1431 kJ |

Example 2

The aim of this study is to understand how the general consumer experiences a supplement based on collagen hydrolysate in terms of ameliorating joint pain. The supplement is prepared from porcine trachea and sternum according to Example 1. The supplement, herein denoted as "HC", is provided by Rousselot BV (Ghent, Belgium).

Materials and Methods

Study Population and Design

This consumer lifestyle study is a placebo-controlled (ratio 5:1, 177 participants with HC and 36 with placebo), participant-blinded randomized parallel trial to evaluate the effect of collagen hydrolysate versus placebo on joint pain.

In order to represent the general consumer who may seek a nutritional supplement to reduce joint pain, the research aimed to gather data on a wide number of people with diverse demographics. Participants were recruited via various sports and health clubs across the United Kingdom. In order to have significant relevant data, the researchers aimed to gather data from a minimum of 200 participants.

Through a placebo-controlled design, the experiment was set-up for the participants to take either 2×0.5 g of HC (experiment group) or 2×0.5 g of maltodextrin (placebo group) on a daily basis, during a trial period of 12 weeks and 4 weeks without run-out period. Participants had to fill in the self-assessment tool for all 16 weeks. The HC and the placebo matched taste, color, odor characteristics. Similar packaging was used for both.

All communication between researchers and participants was done via an online app in which they had to fill in their self-assessment and other observations.

Inclusion criteria for the participants to be included in the study were '18 years of age', 'no medical diagnosis', 'not taking any medication', 'frequent physical activity' and 'not pregnant or currently breast feeding'. For physical activity, it was meant all levels of activity from gardening, brisk walking to marathon training.

The exclusion criteria were defined as 'aged under 18 years', 'currently under a medical diagnosis', 'currently taking/prescribed medication', 'advised not to or does not frequently participate in physical activity' and 'currently pregnant or breast feeding'.

If participants were already using any type of supplementation with Vitamin D, Curcumin/turmeric, other collagen, Green Mussel Extract, Boswellia, Glucosamine, Chondroitin Sulfate, Hyaluronic Acid or Folic Acid, they were excluded from the experiment as well.

Participants that were already supplementing Multivitamin, Iron, Omega 3, Vitamin B complex, Vitamin C, Calcium, Rosehip extract, Amino acid complex or creatine were not excluded as these supplements are not specifically targeting joint health and the results could potentially show any relationship with HC.

Materials

The product used in this study is derived from hydrolyzed porcine trachea and sternum. The starting material was hydrolyzed (according to Example 1) to yield a composition with collagen hydrolysate and chondroitin sulfate (onwards referred to as "HC"). The typical product characteristics of the product are according to Example 1. The HC dosage form was in 0.5 g hydroxypropyl methylcellulose (HPMC) capsules, whilst 0.5 g of maltodextrin in HPMC capsules was used as placebo. Maltodextrin is a food grade material commonly used as a placebo in clinical trials. This product is a tasteless and odourless white powder that holds no micronutrient value and therefore could be used as placebo in this experiment.

Questionnaire Design

In order to have continuous follow-up with the participants, a smartphone app was developed for the participants to hand in their feedback on a weekly basis.

This weekly reporting was composed of several questions. First, they were asked which physical activity they recently had completed and the duration of the activity. A pre-set of activities was provided with e.g. gardening, Brisk Walking, Running, Cycling, Tennis, Swimming, Strengthening sports, Weightlifting (average weight squat 70 kg), Flexibility/balance, Yoga, Pilates or an option box to fill out any unlisted activities. On duration, participants were asked to look at the total on weekly basis and then indicate the amount of time spent (0-5h, 6-10h, 11-15h, 16-20h or 20h or more).

Next, they received a silhouette of a body diagram. Here they could indicate the area of experienced joint pain. Then participants were asked to give their feedback on joint pain using the validated pain measuring instrument Visual Analogue Scale (VAS) (Breivik et al., Br. J. Anaest. 2008 July;

101(1):17-24). The validated measure VAS, combined with a numeric rating system, enables the research to convert data into a pain scoring chart.

The weekly reporting section is designed to make it very simple for participants to give in scores. The scoring tool that was used was chosen based on the accuracy demonstrated in previous similar studies to track subjective pain measures of participants (e.g. Hawker et al. Arthritis Care Res. (Hoboken). 2011 November; 63 Suppl 11:S240-52, Kumar et al. J. Sci. Food Agric. 2015 Mar. 15; 95(4):702-7). At the beginning of the study, each participant had to define their baseline scoring on joint pain. Each week, participants were asked to indicate their pain scores starting at week 1, throughout the trial until week 16.

Participants also had to fill in a short demographic questionnaire asking for gender, age (in ranges), height, weight and waist measurement.

The participants individual pain score portfolio was anonymous in line with the General Data Protection Regulation (EU GDPR).

Weighting Matrix to Calculate Average Activity Impact

To assess the average impact of physical activity, participants were categorized according to the intensity (low (L), moderate (M) and high (H)) and number of activities (1×, 2×, 3×) using a weighting matrix. Walking, swimming, flexibility/balance, gardening, cycling, dancing and horse riding were considered activities of low joint impact. Weightlifting, gym cardio and boxing were considered activities of moderate joint impact. Running, ball sports, skipping and heavy weightlifting were considered activities of high joint impact. Activities' classification was based on the UK National Health Services (NHS) guidelines (Physical activity guidelines for older adults. Available online: https://www.nhs.uk/live-well/exercise/physical-activity-guidelines-older-adults/#moderate (accessed on 3 March)). Regarding the number of activities, "LLL" means that the participant practiced three different types of low intensity activities, "LLM" means that the participant practiced two different types of low intensity activities and one type of moderate intensity activity, and "LLH" means that the participant practiced two different types of low intensity activities and one type of high intensity activity. The other subgroups follow the same rationale. Given that only one participant fitted into category MHH (1× Moderate and 2× High) and would not have statistical relevance alone, this participant was considered in category 5 (LHH or MMH or MHH)).

Statistical Analyses

The Full Analysis population contained all participants eligible for the study, who had taken supplement at least once and who reported at least one weekly VAS measure post exercise.

Continuous data were summarized by their mean, standard deviation (SD), and range. Categorical data were summarized by frequencies and percentages.

The effect of treatment (HC vs. placebo) on changes in mean joint pain score during follow-up in comparison with baseline was studied in detail using generalized linear mixed-effects model (LME) with random intercept (bi) for each subject (each subject has its own intercept).

Follow-up time was treated as a factor variable and since the intake of supplements was stopped at week 12, the analysis was based on the period from baseline until week 12.

Full Model with Interaction:

$$Y_{ij} = (\beta_0 + b_i) + \beta_1 \text{Time}_{ij} + \beta_2 \text{Treatment}_{ij} + \beta_3 \text{Time}_{ij} \times \text{Treatment}_{ij} + \varepsilon_{ij}$$

The interaction term represents the difference between the changes in the expected joint pain, comparing a subject from the HC group to a subject from the Placebo group for a given follow-up time. In case of a non-significant interaction term, it can be concluded that there was not enough evidence of differences between the treatment groups. A second analysis was then performed that includes only the main effects.

Systematic departures from the normality assumptions were verified using QQ-plots and scatterplots of the residuals versus the predictions were used to check for systematic departures from the mean model.

The LME analysis were performed using the lmne package (Pinheiro et al. 2021. nlme: Linear and Nonlinear Mixed Effects Models. R package version 3.1-153) in the R environment (R Core Team, 2019). All analyses were performed in R version 3.6.0. (R Core Team, 2019). A value of p<0.05 was considered statistically significant. No imputation of missing data is performed. The amount of missing data is presented in the tables wherever appropriate.

Results

Subjects Included in the Study

In total, 213 subjects were enrolled in the study (HC/Placebo: 177/36). The drop-out rate was 19% (7/36) in the placebo group and 3% (5/177) in the HC group. Thus, the application tool that was used for follow-up was engaging for participants.

Subject Characteristics

Table 2 summarizes subject demographic and baseline characteristics overall and by treatment group. Subjects ranged in age from 18 to 72 years (mean age: 41 years), with 52.6% of the subjects being females.

TABLE 2

Demographic characteristics of subjects included in the study

| Variable | | Total (N = 213) | HC (N = 177) | Placebo (N = 36) |
|---|---|---|---|---|
| Gender | Female | 112 (52.6%) | 94 (53.1%) | 18 (50.0%) |
| | Male | 101 (47.4%) | 83 (46.9%) | 18 (50.0%) |
| Age (years) | Mean (SD) | 40.7 (11.0) | 40.2 (11.0) | 42.1 (11.0) |
| | Range | 18-72 | 18-67 | 23 72 |
| Age category | <30 | 39 (18.3%) | 35 (19.8%) | 4 (11.1%) |
| | 30-39 | 59 (27.7%) | 48 (27.1%) | 11 (30.6%) |
| | 40-49 | 69 (32.4%) | 57 (32.2%) | 12 (33.3%) |
| | 50-55 | 27 (12.7%) | 22 (12.4%) | 5 (13.9%) |
| | 55+ | 19 (8.9%) | 15 (8.5%) | 4 (11.1%) |

Joint Pain Alleviation by HC Vs Placebo

FIG. 1 shows the changes in the participants' joint pain over a period of 16 weeks. A linear mixed effects model revealed a significant interaction between treatment and time on treatment (p<0.001). The results suggest that there are differences between the placebo and HC group in terms of subject-specific changes in expected joint pain feel. Subjects that took HC showed a significant (p<0.001) reduction in mean joint pain feel starting from week 3 when compared to the subjects from the placebo group. Note also that the difference between the HC and placebo group increased with time on treatment.

After 12 weeks, the treatment was stopped and the average joint pain score starts to increase again in the HC group (FIG. 1). At week 16, the average joint pain score for the HC group was still significantly lower compared to baseline (paired sample t-test, p<0.001) and there was also a significant difference between HC and the placebo group (independent sample t-test, p<0.001). A decrease in joint pain was sustained 6-8 weeks after stopping the treatment.

Figure 2:
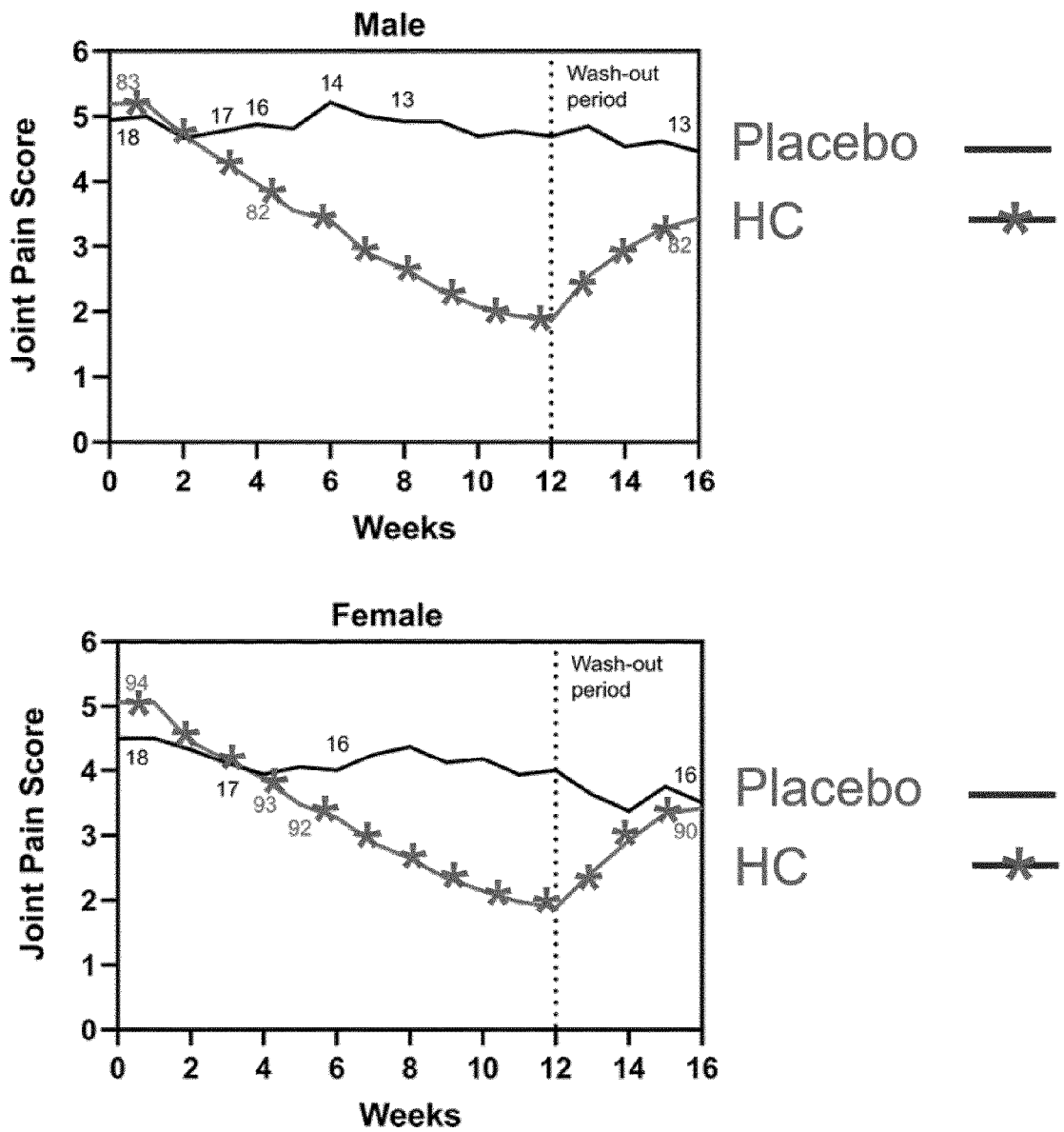
FIG. 2. Effect of composition based on collagen hydrolysate (HC) versus placebo on joint pain by gender. The study period was 16 weeks. Intake of the supplements was stopped after 12 weeks (represented by the vertical dashed line). The number of participants throughout the study is depicted in the figure.

FIG. 2 shows the effect of HC versus placebo on joint pain by gender. There was no evidence of a significant three-way interaction, and no interaction between gender and treatment and between gender and time (p>0.05). Furthermore, the LME model revealed that joint pain scores were statistically similar between genders (p=0.469).

Figure 3:
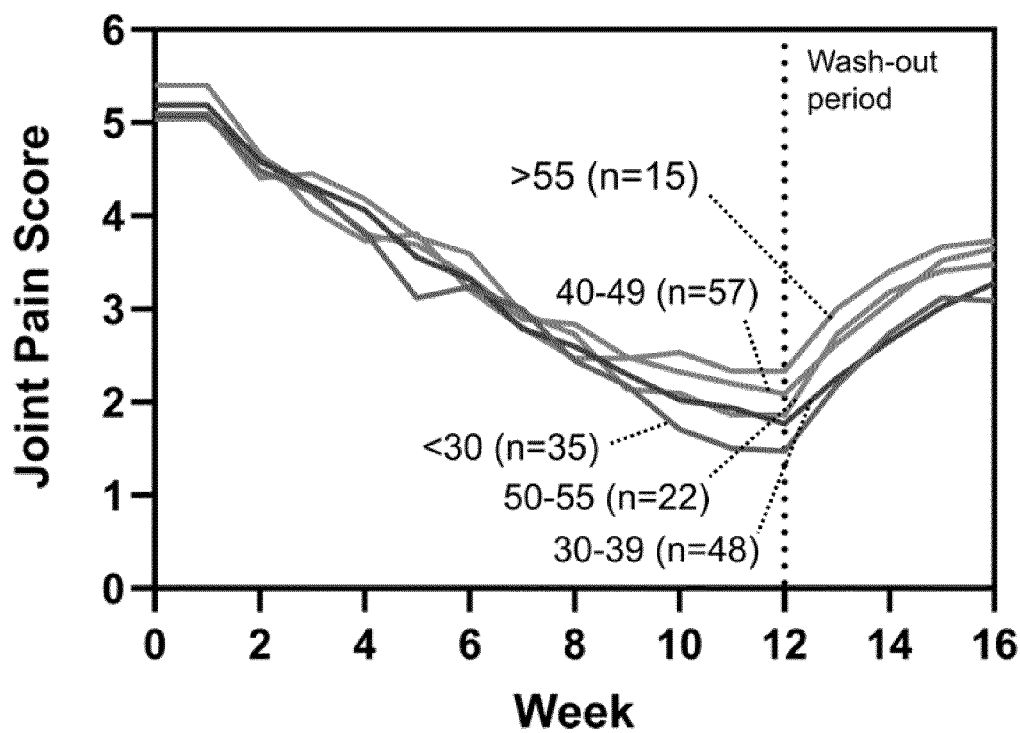
FIG. 3. Effect of composition based on collagen hydrolysate (HC) versus placebo on joint pain by age category. The study period was 16 weeks. Intake of the supplements was stopped after 12 weeks (represented by the vertical dashed line). The number of participants throughout the study is depicted in the figure.

FIG. 3 shows the effect of HC versus placebo on joint pain by age category. The LME model revealed a significant interaction between age and time on treatment (p=0.005), highlighting that different age categories differ in their joint pain levels for HC treatment over time. Therefore, the pattern of joint pain alleviation among age categories for HC treatment was compared using as reference the participants with age <30 years, who reported the lowest joint pain scores among age categories. After 10 weeks on treatment, subjects between 40-49 years had on average higher joint pain scores compared to subjects <30 years (mean difference 0.71, 95% CI 0.25-1.18, p<0.01). This difference was recorded late in the study. Study participants below age 30 reported the lowest joint pain scores among age categories. Overall, all subgroups had joint pain levels significantly below the levels reported at the baseline of the study in all age categories.

Figure 4:
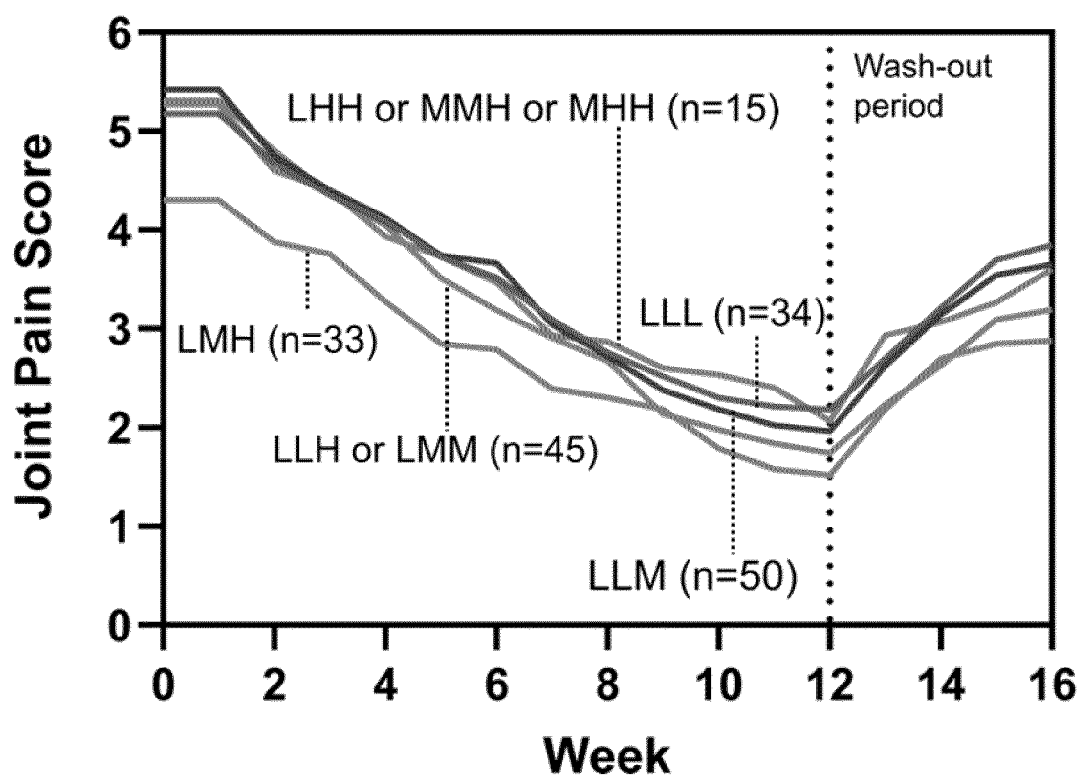
FIG. 4. Effect of composition based on collagen hydrolysate (HC) versus placebo on joint pain according to physical activity impact. The study period was 16 weeks. Intake of the supplements was stopped after 12 weeks (represented by the vertical dashed line). The number of participants throughout the study is depicted in the figure.

FIG. 4 shows the effect of HC versus placebo on joint pain according to physical activity level. The statistical analysis revealed that joint pain scores were consistent among the different subgroups of physical activity (p=0.091). The range of treatment differences suggests that the effect of HC treatment is consistent across different physical activity subgroups.

Overall, a reduction in joint pain was seen following intake of HC, regardless of gender, age group and activity intensity. This indicates that HC intake has a positive effect on the general population, including active adults of different age groups and lifestyles. The general trend was that the reduction in joint pain is observed starting 3 weeks after the begin of HC intake, and is sustained for 6-8 weeks after stopping HC intake.

The reduction in joint pain appears largest in subjects in the age category <30 years; these may be subjects which are most active and healthy.

Table 3 shows the reduction in pain by HC in subjects experiencing different types of joint pain. The reduction in joint pain is seen regardless of the nature of the joint pain, but the effect is most pronounced in (healthy) subjects post-exercise.

TABLE 3

Change in VAS score in subjects experiencing different types of joint pain, after daily oral administration with HC for 12 weeks

| Type of joint pain | Reduction VAS score |
| --- | --- |
| Joint pain in septic arthritis | Lowest |
| Joint pain in osteoarthritis | Average/High |
| Joint pain after exercise | Highest |

Example 3

The method of Example 1 was used, wherein the comparison was made between porcine bone, porcine hide, porcine trachea, or porcine sternum as starting material for hydrolysis.

Table 4 shows that daily treatment with a composition derived from porcine bone or porcine hide does not lead to a large reduction in joint pain after 12 weeks. In comparison, daily treatment with a collagen hydrolysate composition derived from porcine trachea or porcine sternum leads to more than 50% reduction in the VAS score after 12 weeks. Similar results were obtained with bovine-derived tissues. Chicken sternum was found to be less effective in reducing joint pain as compared to porcine or bovine sternum, indicating that there may be species-dependency in the pain-reducing effect.

TABLE 4

VAS score after 12 weeks daily intake of HC derived from different collagen-containing materials.

| | VAS score |
| --- | --- |
| Placebo | 4.5 |
| HC derived from porcine bone | 4.0 |
| HC derived from porcine hide | 4.0 |
| HC derived from porcine trachea | 2.0 |
| HC derived from porcine sternum | 2.0 |

Example 4

The method of Example 1 was used, but using different combinations of porcine bone, hide, trachea, and sternum to obtain a starting material for hydrolysis with different relative amounts of collagen type I, II and III.

Table 5 shows that a composition prepared from a starting material comprising predominantly type I or type II collagen has a pain-reducing effect, albeit limited. In comparison, a composition prepared from a starting material comprising type I, II, and III collagen in a weight ratio of ~5:5:1 has a far greater pain-reducing effect. The collagen hydrolysate obtained from this starting material has a Hyp/Hyl molar ratio of more than 8 and less than 15.

The pain-reducing effect is highest for a relatively high amount of chondroitin sulfate in the composition. In the current example, the highest reduction in pain is found for a composition comprising 70% collagen hydrolysate and 30% chondroitin sulfate.

TABLE 5

Starting material, obtained composition and the effect on lowering pain.

| Group # | Type I:II:III col starting material | Hyp/Hyl in composition | HC/CS (%) in composition | Reduction VAS score |
|---|---|---|---|---|
| 1. | 1:5:1 | 4.0-8.5 | 82.5/17.5% | Very low |
| 2. | 5:1:1 | 15-25 | 82.5/17.5% | Very low |
| 3. | 5:5:1 | 8.5-15 | 82.5/17.5% | High |
| 4. | 1:5:1 | 4.0-8.0 | 70/30% | Low |
| 5. | 5:1:1 | 15-25 | 70/30% | Low |
| 6. | 5:5:1 | 8.5-15 | 70/30% | Highest |

HC: collagen hydrolysate,
CS: chondroitin sulfate,
Hyp/Hyl: molar ratio of hydroxyproline and hydroxylysine.

Table 6 shows that type III collagen contributes in reducing pain. A ten-fold reduction type III collagen in the starting material leads to a lower pain-reducing effect.

TABLE 6

Starting material, obtained composition and the effect on lowering pain.

| Group # | Type I:II:III col starting material | Hyp/Hyl output material | HC/CS (%) in composition | Reduction VAS score |
|---|---|---|---|---|
| 1. | 5:5:1 | 8.5-15 | 82.5/17.5% | High |
| 2. | 5:5:0.1 | 7.0-14 | 82.5/17.5% | Average |
| 3. | 5:5:1 | 8.5-15 | 70/30% | Highest |
| 4. | 5:5:0.1 | 7.0-14 | 70/30% | Average |

HC: collagen hydrolysate,
CS: chondroitin sulfate,
Hyp/Hyl: molar ratio of hydroxyproline and hydroxylysine.

The invention claimed is:

1. A method for ameliorating joint pain in a subject after exercise, comprising:
 administering a composition to the subject,
 wherein the composition comprises 10-40 wt. % chondroitin sulfate and 60-90 wt. % collagen hydrolysate, calculated on the total weight of the chondroitin sulfate and the collagen hydrolysate, and
 wherein the collagen hydrolysate is derived from the hydrolysis of a mixture of collagen comprising type I, type II, and type III collagen such that the collagen hydrolysate comprises hydroxyproline and hydroxylysine in a molar ratio (hydroxyproline:hydroxylysine) of more than 8 and less than 15.

2. The method according to claim 1, wherein the subject is a healthy individual.

3. The method according to claim 1, wherein the collagen hydrolysate comprises 2-20 wt. % hydroxyproline, wherein the wt. % is calculated on the total weight of the amino acids in the collagen hydrolysate.

4. The method according to claim 1, wherein the collagen hydrolysate comprises 0.1-5 wt. % hydroxylysine, wherein the wt. % is calculated on the total weight of the amino acids in the collagen hydrolysate.

5. The method according to claim 1, wherein the composition comprises 15-40 wt. %, or 20-40 wt. %, or 30-40 wt. % chondroitin sulfate, calculated on the total weight of the chondroitin sulfate and the collagen hydrolysate.

6. The method according to claim 1, wherein the collagen hydrolysate has an average molecular weight of more than 1000 Da and less than 10000 Da.

7. The method according to claim 1, wherein the composition is administered orally.

8. The method according to claim 1, wherein the composition is provided as a food supplement.

9. The method according to claim 1, wherein the composition is administered at a daily dose of 0.2-2 g, wherein the daily dose is the total dry weight amount of the composition.

* * * * *